US008856246B2

(12) United States Patent
Post et al.

(10) Patent No.: US 8,856,246 B2
(45) Date of Patent: Oct. 7, 2014

(54) SYSTEM AND METHOD FOR PROJECT MANAGEMENT SYSTEM OPERATION USING ELECTRONIC MESSAGING

(75) Inventors: Eyal Post, Shoham (IL); Rachel Haim, Rishon Leziyon (IL)

(73) Assignee: Clarizen Ltd., Hod Hasharon (IL)

( * ) Notice: Subject to any disclaimer, the term of this patent is extended or adjusted under 35 U.S.C. 154(b) by 119 days.

(21) Appl. No.: 13/206,938

(22) Filed: Aug. 10, 2011

(65) Prior Publication Data

US 2013/0041958 A1 Feb. 14, 2013

(51) Int. Cl.
*G06F 15/16* (2006.01)
*G06Q 10/10* (2012.01)

(52) U.S. Cl.
CPC ............ *G06Q 10/107* (2013.01); *G06Q 10/103* (2013.01)
USPC ............ 709/206; 709/205; 709/207; 717/101

(58) Field of Classification Search
USPC ........................................................ 709/206
See application file for complete search history.

(56) References Cited

U.S. PATENT DOCUMENTS

| 2003/0046297 | A1* | 3/2003 | Mason .......................... 707/102 |
| 2007/0094661 | A1 | 4/2007 | Baird et al. |
| 2010/0293278 | A1* | 11/2010 | Boyd et al. .................... 709/226 |
| 2012/0151377 | A1* | 6/2012 | Schultz et al. ................ 715/751 |

* cited by examiner

*Primary Examiner* — Tauqir Hussain
(74) *Attorney, Agent, or Firm* — Pearl Cohen Zedek Latzer Baratz LLP

(57) ABSTRACT

Method, system and non-transitory computer-readable medium for project management database update for a project management application. An interface may be provided for variable definition by user-input in a rule to trigger an action within the project management database, where the variable is identified by a label and the label is provided to signal a location of data for the variable in an electronic message, such as an e-mail or text message. An electronic message received for a mailbox may be parsed to locate the label in the received electronic message and thereby obtain data in the electronic message that corresponds to the variable. An action may be triggered according to the data corresponding to the variable, where the action causes an update to the project management database of the project management application.

18 Claims, 23 Drawing Sheets

| | |
|---|---|
| Task Name | |
| Email.subject | |
| Task Creator | |
| Email.sender | |
| Associated Project | |
| ProjectVar | |
| Resources | |
| Email.CC | |
| Due Date | |
| DueDateVar | |
| Note | |
| Email.Body | |
| Documents | |
| Email.Attachments | |

732 — Task Name / Email.subject
734 — Task Creator / Email.sender
736 — Associated Project / ProjectVar
738 — Resources / Email.CC
740 — Due Date / DueDateVar
742 — Note / Email.Body
744 — Documents / Email.Attachments

SYSTEM AND METHOD FOR PROJECT MANAGEMENT SYSTEM OPERATION USING ELECTRONIC MESSAGING

FIELD OF THE INVENTION

Embodiments of the present invention relate to the field of computer-based electronic messaging systems and also to the field of project management and/or workflow management systems. More particularly, embodiments of the present invention relate to systems for using electronic messaging such as e-mail or text messaging for operating a project management or workflow management system.

BACKGROUND OF THE INVENTION

Electronic messaging has become a leading tool for workplace productivity and communication. In today's world of globalization (where people in many different locations collaborate on projects), messaging such as by e-mail or text messaging, has become a primary way, for example, to exchange ideas and documents, perform scheduling, set priorities and address issues concerning a project or other endeavor. The inclusion of e-mailing and text messaging features into mobile devices, such as "smartphones" (mobile telephones having personal computer (PC) like functionality) has also made electronic messaging an important element for on-the-go individuals working on projects for businesses and other organizations.

Individuals working on projects in a global workplace environment can be spread out in locations within a city or even around a nation or the world, and thus the use of e-mail and text messaging, through mobile devices like smartphones and other computer devices may allow the individuals to contribute no matter where the individuals are located. As long as the mobile device can communicate with a network, such as the Internet, a user may from a smartphone send an e-mail or a text message and communicate with others.

With all of the advantages electronic messaging may provide to individuals and to workplace function, messaging systems such as e-mail and text may provide only limited ability for users to perform project management and workflow management tasks. An e-mail or text message commonly may allow individuals to send information to a receiver and also to copy (e.g. "CC", "BCC") other individuals (e.g. others working on the same project). However, messaging systems such as e-mail and text messaging as commonly available provide little or no ability to carry out the appropriate work processes or even sharing beyond limited information distribution.

SUMMARY OF THE INVENTION

An embodiment of the present invention may provide a method and system for performing work related tasks using a flexible, rules-based, user-defined message interface and a message center, where messages may be sent to mailboxes specifically associated with project elements in a project management database managed by a project management application. An example is presented herein where the medium for messaging is e-mail. However, other types of messaging systems such as text messaging or other electronic messaging, may also be used for performing project management tasks in accordance with embodiments of the present invention.

A method for project management database update for a project management application may include providing an interface for variable definition by user-input in a rule to trigger an action within the project management database (where the variable is identified by a label and the label is provided to signal a location of data for the variable in an electronic message), parsing an electronic message received for a mailbox to locate the label in the received electronic message and thereby obtain data in the electronic message that corresponds to the variable, and triggering an action according to the data corresponding to the variable, wherein the action causes an update to the project management database of the project management application.

In different embodiments a message center used in conjunction with a project management application and project management database may allow a business or other organization to activate the message center for organization use, create a new mailbox, add rules to a mailbox and order the rules in a hierarchy, allocate resources (such as employees or other resources) to a project management object, create rules for object/entity types (such as rules for all project objects, task objects, etc.), automate processes for receiving case or incident information (e.g. by allowing the receipt of support or maintenance requests through electronic messages), export vCard or other contact information to a user, and package mailboxes, related rules and custom variables into applications which may be sold or otherwise distributed through a marketplace.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7A-7B illustrate interfaces for making a rule, according to an embodiment of the invention;

Figure 1A:
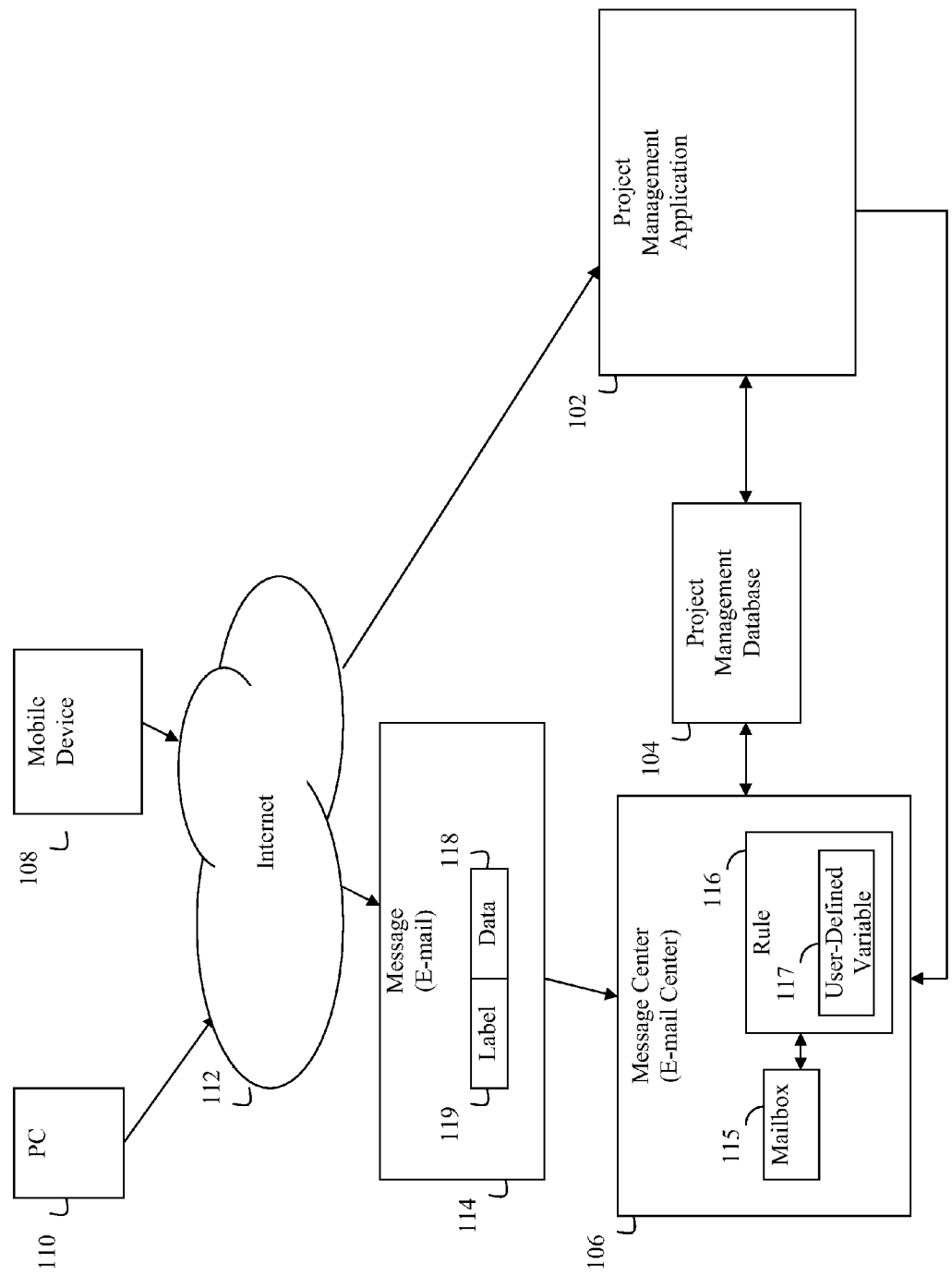
FIG. 1A illustrates a system for project management using an message center system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. An example embodiment is presented where e-mail is the medium for messaging used. However, in other examples, other messaging media can be used, such as text messaging and other electronic messaging.

In embodiments of the present invention, messages such as e-mail messages may be received, and information in the messages may be applied to rules. If the information satisfies a rule, the rule may trigger an action, such as an action relevant to a project management system.

A number of rules may be stored in, for example, a computer or server. Rules may be "if-->then" rules, where the "if" portion is satisfied if a set of parameters or variables exist in the message, or where the "if" portion is satisfied if a set of parameters or variable fall within a range or match certain pre-defined requirements. The parameters or variables may be provided in messages, labeled. An e-mail message may be parsed and the parameters extracted. If the parameters match or satisfy a rule, the rule may be triggered, and the "then" portion, such as an action, may be taken or executed.

One or more of rules may be defined in advance for one or more addresses or e-mail mailboxes. If more than one rule is defined for a mailbox, the rules may be ordered or placed in a hierarchy. In one embodiment, the first rule that matches or satisfies parameters in an incoming message is used (and triggers an action); in other embodiments more than one rule may be used.

In one embodiment, rules may be processed to evaluate, in order (other orders, and other criteria are possible), end user parameters, and evaluation criteria. A rule that passes both may trigger actions, and upon or after an action is taken, a success message may be sent. Evaluation criteria may include criteria according to which the system may determine whether the particular rule should be executed (e.g., trigger an action) or not. A rule may be executed if all mandatory parameters were supplied by the user, and evaluation criteria result in a determination of passing. A failure of a rule to pass end-user parameter evaluation or evaluation criteria may result in an attempt to execute a next rule. If no rules are executable, an error may be returned or sent to the user.

Reference is now made to FIG. 1A, which illustrates a system for project management using a message center system, according to an embodiment of the invention, where the medium for messaging is e-mail. FIG. 1A depicts project management application 102 coupled to project management database 104. Project management application 102 may be an application such as on-line project management software that provides functions of task setting and scheduling and resource management for projects undertaken by a business or other organization as well as additional functions such as document storing, initiating discussions, etc. As used herein a project management application may include computer-based applications for performing project management or workflow management. Project management database 104 may contain database files and tables maintained by project management application 102 concerning projects.

Project management application 102 may provide that a project undertaken by a business or other organization may be organized into elements, such as work items (such as "Project", "Milestone" and "Task") and issue types (such as for example Issues, Requests, Bugs, Risks, etc.). In such a system a project may be made up of a number of milestones. Milestones may be met by accomplishing a number of tasks. In addition, work items can be coupled with timelines, resources and resource availability definitions, budget, time reporting, as well as collaboration items, such as documents and notes.

In one example, project management application 102 may be, for example, the on-line project management application known as the Clarizen Work Execution Solution and which may be available from Clarizen Ltd., Hod Hasharon, Israel. The use of the Clarizen system is just one example of a project management application 102, which may be suitable in embodiments according to the present invention. In other examples, other project management applications may also be used for a system for performing project management tasks.

In function, project management application 102 may execute actions concerning project management elements (e.g. projects, milestones, tasks, etc.) in response to commands. To enable the performance of project management application functions by messaging such as e-mail messages, an embodiment may provide a message center, in this case e-mail center 106.

E-mail center 106 may allow users operating computer terminals (e.g. 108, 110) to interface with project management application 102, using electronic messages, in this example e-mail messages. E-mail center 106, for example, may be connected to one or more networks such as the Internet 112 (e.g. a global system of interconnected computer networks using, e.g. the Internet Protocol (TCP/IP)) to allow communication between terminals 108, 110 and message center 106 through electronic messages 114 (electronic mail in this example). Other networks may be used. Electronic mail, commonly called e-mail, or e-mail may include systems and processes for exchanging digital messages from an individual (an author) to one or more recipients. E-mail systems may be commonly available for sending e-mail across the Internet (and also other computer networks) following, for example, a store-and-forward model. With a store-and-forward model, e-mail servers may accept, forward, deliver and store messages, but the users are not required to be on-line simultaneously for any exchange.

For initially activating e-mail center 106 and for performing tasks such as creating mailboxes and defining e-mail processing rules that may be associated with created mailboxes, users (such as administrator users) on terminals, such as computers 108, 110, may access project management application 102 using an on-line access.

In one example, e-mail center 106 may provide rules, which may allow users to send messages that trigger or execute operations in project management database 104. The system may allow a user to set up or create a mailbox or address for receiving text or other messages for a particular task or function related to project management, and then define or create rules that may be applied to all messages received at that address or mailbox. E-mail center 106 may process received messages according to or matching to the rules defined by the corporation for the particular mailbox and then trigger or execute actions (or operations) in the project management database 104 specified by the rule. Actions triggered by a rule may include project management system functions such as, for example (other actions may be triggered or executed):

Creation of new tasks;
Creation of new work items;
Creation of new issues (related to a project or a department);
Updating of existing data;
Uploading of documents, etc.

When e-mail mailboxes or other addresses have been created (and rules are defined to be associated with the mailboxes), messages 114 (e.g. e-mail) may be sent that (if they match, satisfy conditions of, or trigger a rule) may trigger operations within project management database 104.

For example, a user (such as an administrator) may create mailbox 115 and associate with mailbox 115 a processing rule, such as rule 116, which e-mail center 106 may use to process an e-mail message coming to mailbox 115. Each mailbox may have its own set of user-defined rules. The rules may be user-created and may include data parameters customized by the user.

In different examples, mailboxes may be created that include global mailboxes and entity-type mailboxes. Global mailboxes may be those mailboxes that apply or cause actions organization-wide, while entity mailboxes may be mailboxes that apply only to a specific project, task or milestone an organization undertakes. In an example using e-mail for messaging, global mailboxes may have names, such as:

Support@XCorporation.host.com (to handle support issues organization-wide, e.g. for the products that XCorporation sells);
Maintenance@XCorporation.host.com (to handle maintenance issues within the organization);
TrackIt@XCorporation.host.com (to track the shipping and delivery of the products sold by the organization);
NewTasks@XCorporation.host.com (to create tasks for different projects that are on-going throughout the organization);
NewMilestones@XCorporation.host.com (to create milestones for different projects throughout the organization); and
NewProjects@XCorporation.host.com (to create new projects throughout the organization).

Global mailboxes may serve to create new objects (elements) in project management database 104 (such as new task or new project elements). Entity (or object-related, per entity type) mailboxes may be related to the specific objects (or elements) created in the project management system. In an example where e-mail is used for messaging, entity-type mailboxes may have names, such as:

Project1@XCorporation.host.com;
Version5.2@XCorporation.host.com;
DifficultTask@XCorporation.host.com; and
MajorMilestone@XCorporation.host.com.

While mailboxes are described as the receiving structure or address, other receiving structures or addresses may be used if other messaging is used (e.g., text messaging). As may be seen above, mailboxes may be created for global actions, such as creating a new issue within an issue management subsystem of project management application 102. Mailboxes may also be created for specific objects within the system. A high priority project that may require a wide range of tasks, such as documentation, expense sheets and the like, may have separate mailboxes set up or created for each of those tasks objects (e.g. a mailbox for the task of collecting expenses, a mailbox for gathering documentation, etc).

Referring again to FIG. 1A, an administrator may create mailbox 115 to be a global mailbox (applying to projects organization-wide), such as a mailbox with the name NewTasks@XCorporation.host.com. The administrator may further establish through rule 116, that e-mail messages (e.g. message 114) sent to the NewTasks mailbox will create new task objects for projects in project management database 104. Other types of mailboxes such as project, or entity-specific mailboxes may also be created.

Users may specify with the rules defined parameters for input and an expected input format. The rules may allow users to specify data such as which project management actions may be taken in project management database 104 (using the input parameters specified by the user in the rule-expected format). An incoming message sent to or received at one of the defined mailboxes or other addresses may trigger application of a rule defined for the mailbox. A rule may define actions such as:

Adding or modifying a project management element of the project management application (such as adding a task, or milestone or project);
Adding an attachment or discussion to a project management element (such as adding a discussion to a project or a task); and
Performing a query and obtaining data from a project management application database and providing the information in a return message.

Once a user sends a message, the message center on receiving the message may extract data from the message (e.g. parsing to extracting data from established fields in the message, such as the subject line or CC line, and parsing data from the message body) and trigger actions on behalf of those the user in project management database 104. Rules may be matched to message data, and if rules conditions are satisfied, actions taken.

Users may send a message to a mailbox (e.g. from a messaging application) that may reside on the user's local computer (e.g. computers 108, 110). In an example where e-mail is used for messaging, an e-mail application, such as Outlook™ by Microsoft Corporation of Redmond, Wash. may be compatible for sending e-mail to the message center. In such an example, users may send an e-mail message to one of the mailboxes of message center 106, without the need of any add-on or special software to work with the e-mail application.

In one further example, rule 116 may include one or more user-defined variable(s) 117 to gather data that may be required by the rule. A user, such as an administrator, when defining the parameters of rule 116 may include user-defined variable 117 as one of the parameters. A message center, such as e-mail center 106 may provide an interface for variable definition by user-input in a rule, such as rule 116, to trigger action within the project management database 104. Rule 116 may require that for an in-coming message to be processed according to the rule parameters, that message 114 must provide data 118 for user-defined variable 117 and that data must be identified by label 119. Rule 116 may provide that if message 114 incoming to mailbox 115 can provide data 119 for the user-defined variable 117, a rule condition (or parameter of the rule) may be satisfied and the rule may then trigger or cause to be executed operations to be performed in project management database 104. For example, a mailbox such as NewTasks@XCorporation.host.com may include a user-defined variable called "ProjectVar" and may require that an e-mail sender specify a project name using a label, or multiple labels for multilingual support such as "Project." When an user, such as an employee of XCorporation sends an e-mail message to mailbox 115 (and rule 116 requires an e-mail message to identify a project name), the e-mail sender may include, for example in the body or text of his or her e-mail message, a label and data for a project name, such as:

Project: Project X

E-mail center 106, when processing message 114 may locate the name of the project by parsing the e-mail body text to find label 119 ("Project") and corresponding data 118 ("ProjectX"). Other variables and labels may be specified using a flexible interface for providing user-defined (or custom) variables in message processing rules. A method for project management database update may include providing a rule to trigger an action within the project management database, where the rule defines a variable identified by a label and data may be identified by that label within an electronic message (such as an e-mail) that corresponds to the variable, thus triggering an action (according to the data found in the e-mail) to update project management database 104.

Figure 1B:
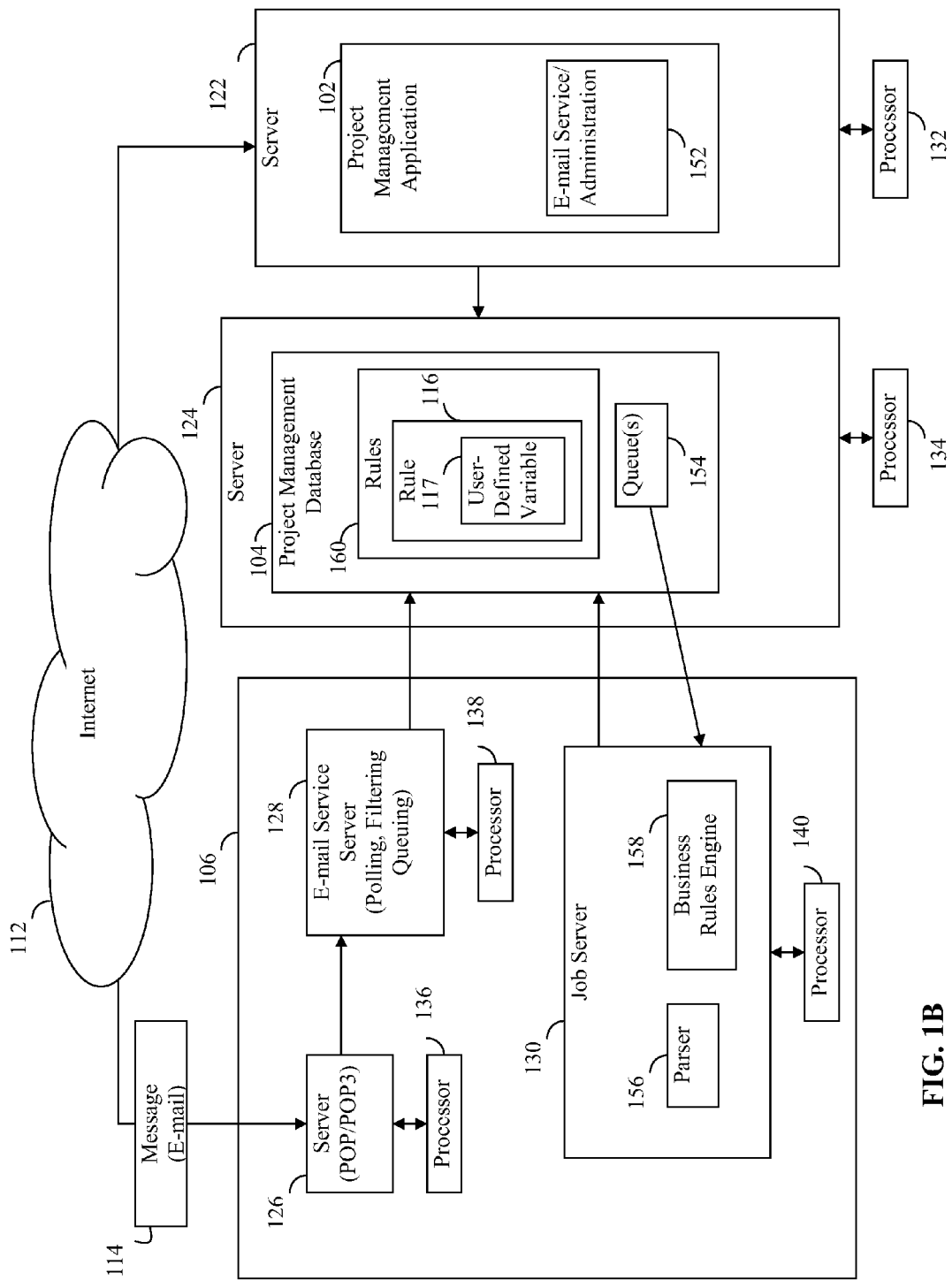
FIG. 1B illustrates a server configuration for project management using a message center system, according to an embodiment of the invention.

Reference is now made to FIG. 1B, which illustrates a server configuration for project management application 102, project management database 104 and e-mail center 106, according to an embodiment of the invention. FIG. 1B depicts servers 122, 124, 126, 128, 130 each operating elements of the project management/message center system (where the messaging medium is e-mail). Servers 122, 124, 126, 128, 130 may each be one or more computers configured as serving computers, e.g. each operated by one or more processors 132, 134, 136, 138, 140, respectively. In this example, project management application 102 may be executed or operated on server 122. Project management database 104 may be executed or operated on server 124. E-mail center 106 may include a number of servers, such as servers 126, 128, 130. Embodiments of the present invention may be carried out by one or more controllers or processors such as processors 132, 134, 136, 138, 140, executing instructions or software to perform methods as discussed herein.

An administrator for the project management system e.g. using project management application 102 for a business or other organization, may access project management application 102 to activate the e-mail center 106 for his or her organization and to create mailboxes for messaging use and also to define rules for processing e-mail messages that may be associated with specific mailboxes. Project management application 102 may include e-mail service/administration modules 152 (e.g. activation unit, mailbox creation or generation unit, rule-making unit, etc.) to facilitate the activation, set-up and use of e-mail center 106 for a business or other organization.

When e-mail messages are used to perform project management operations (e.g. when an e-mail message is addressed and sent to a mailbox, such as Support@XCorporation.host.com, NewTasks@XCorporation.host.com, Project1@XCorporation.host.com, etc., the e-mail messages may arrive for processing by e-mail center 106 at server 126, which may be a standard POP (Post Office Protocol) server. A POP mail server (such as a POP3 server) may be a computer server that complies with a standard, such as RFC standard 1939.

The POP protocol may allow mailboxes (e.g., mail drops) to be maintained on server 126, where a message service server, such as e-mail service server 128, may poll the established POP3 mailboxes for messages. The POP protocol may support a download and delete process when accessing e-mail messages (e.g. server 126 may delete the e-mail messages that server 128 accesses and retrieves). A POP protocol may be just one standard that is suitable for maintaining mailboxes on server 126, and, in other examples of a messaging system for e-mail messages, other standards such as IMAP (Internet Message Access Protocol) may be used.

E-mail service server 128 may access server 126 to retrieve in-coming e-mail messages. E-mail service server 128 may poll server 126 (e.g. a POP3 server) for in-coming e-mail messages. E-mail service server 128 may also perform initial filtering of e-mail messages to determine if an e-mail message is valid. This may be done by checking if the message arrived from an e-mail address that is already known to the system (e.g., an e-mail address of an existing user within the system). If an e-mail message is valid, the e-mail message may be inserted into queue(s) 154 maintained on project management database 104 (e.g. on server 124).

As messages fill queue(s) 154, job server 130 (e.g. operated by processor 140) may pull or access messages from the queue(s) 154 for processing. Job server 130 may include parser 156 and business rules engine 158 to process messages pulled from queue(s) 154. Rules 160 for processing e-mail messages may be defined and associated (e.g. by an administrator) for each mailbox created. Those rules may be stored for example in project management database 104 (Rules 160 shows rule 116 from FIG. 1A with user-defined variable 117). Business rules engine 158 may take information from parser 156 and apply the information to rules.

Business rules engine 158 may apply the rules defined by the administrator on a message to be processed and then perform the relevant actions dictated by the rules and the message on the project management elements stored in project management database 104. As with other processing entities described herein, business rules engine 158, and parser 156 may be instructions executed by a processor, such as processor 140. Embodiments of the invention may be carried out by one or more controllers or processors such as processor 140, executing instructions or software to perform methods of business rules engine 158 and parser 156 as discussed herein.

Figure 2A:
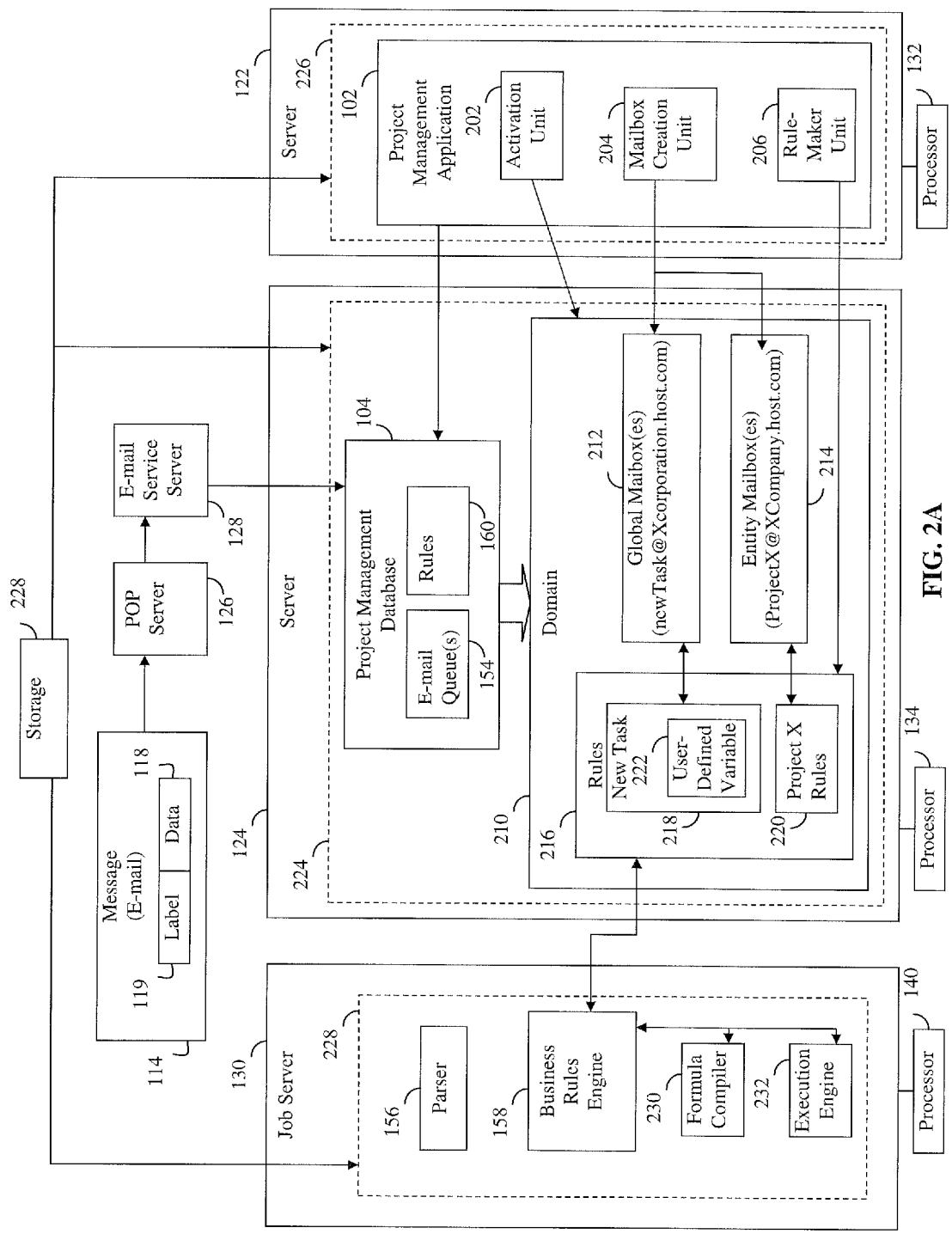
FIG. 2A illustrates a message center, according to an embodiment of the invention.

Reference is now made to FIG. 2A, which illustrates message center mailboxes (such as mailboxes for e-mail messages), rules and domains, according to an embodiment of the invention. In the example using e-mail as the messaging medium, activation of e-mail center 106 by an organization may allow the organization to establish a mailbox domain having mailboxes that are associated with rules for processing. FIG. 2A shows domain 210 of an organization such as XCorporation (where the organization may be a subscriber for project management services from an on-line host of project management application 102). Domain 210 may have a name, such as XCorporation.host.com, and domain 210 may be created as an e-mail center domain for the users (employees and clients) of XCorporation. If the Clarizen project management application is used (where clairizen.com is host of the message center for processing e-mail), the domain may be "XCorporation.clarizen.com". Other hosting entities are also possible.

Within domain 210 XCorporation (through an administrator) may have created e-mail mailboxes 212, 214 so users of XCorporation's project management application may send e-mail messages that trigger execution of project management tasks. Rules 216 may be created for the mailboxes of domain 210, and each mailbox (e.g. 212, 214) may be associated with a number of rules (e.g. 218, 220, respectively) that facilitate the processing of the e-mail sent to the specific mailboxes. Some of the rules may be created with custom, user-defined variables, and other rules may be created where no custom, user-defined variables are specified or required. For example, in FIG. 2A, rule 218 (New Task rule) has been specified with user-defined variable 222 (requiring specific e-mail data identified by a label), while rule 220 (Project X rule) has no custom, user-defined variable specified.

Project management application 102 may include elements or functionality an administrator of XCorporation may use to activate the e-mail system, create mailboxes and establish rules for the mailboxes. Processor 132 may execute project management application 102 (e.g. on server 122), and project management application 102 may be software executed by processor 132 to perform the functions discussed herein. As shown in FIG. 2A, project management application 102 may include activation unit 202, mailbox creation unit 204, and rule maker or generation unit 206. Activation unit 202 may be used to activate e-mail center 106 for XCorporation's execution of project management tasks by e-mail. For example, a business organization such as XCorporation may be a licensed user of project management application 102 (licensed for on-line use via Internet 112), and XCorporation may want to activate e-mail center 106 to allow the users from XCorporation (employees and/or customers) to add and edit objects in project management database 104 (and perform other project management tasks) via e-mail messages. Activation unit 202 may generate domain 210 for use by the employees and customers of XCorporation.

Mailbox creation unit 204 may allow a system administrator of XCorporation (or other similarly authorized person) to create mailboxes for performing project management operations in project management database 104 by e-mail. Mailboxes may include for example global e-mail message inboxes (represented by mailbox 212), such as: NewTasks@XCorporation.host.com, etc. or object-related (per entity type) mailboxes, represented by mailbox 214 (which may be related to specific objects or elements of the project management system already been created), such as: ProjectX@XCorporation.host.com, Mailbox creation or generation unit 204 may create global mailbox 212 (e.g. newTask@XCorportion.host.com) and/or entity mailbox 214 (e.g. ProjectX@XCorporation.host.com) for domain 210 on commands executed by a system administrator or other authorized personnel of XCorporation, where each mailbox created 212, 214 may have associated with it one or more rules 216. For example in FIG. 2A, rule 218 may be associated with global mailbox 212 and rule 220 may be associated with entity mailbox 214. Mailbox creation unit 204 may supply rules 218, 220 as template rules (e.g. from rules 160 of project management database 104 shown in FIG. 1B) or a user may create his or her own customized rules with rule-maker unit 208 (e.g. rule 218 (the New Task rule) may have been created with rule-maker unit 206 to include custom, user-defined variable 222).

In the example of rule 218, XCorporation may wish to allow its employees the ability to quickly add new tasks to project management database 104, without having to directly access project management application 102. After the system administrator (or other authorized person) has created a global mailbox (e.g. 212) such as NewTasks@XCorporation.host.com (and has created rule 218), users (either according to permissions or with no restrictions, depending on the construction of rule 218) may send an e-mail message to NewTasks@XCorporation.host.com and establish new project management task elements according to the specifics of rule 218.

When an e-mail message is sent (e.g. e-mail message 114), business rules engine 158 after receiving the message may process e-mail message 114. Business rules engine 158 may access rule 218 that is associated with global mailbox 212 and process the e-mail message according to the rules associated with the mailbox. Rule 218, in this example includes user-defined variable 222, which may require an e-mail message sender to include in the message data that may be used for the user-defined variable. User-defined variable 222 may be a variable such as "ProjectVar" and rule 218 may require that an e-mail sender include, e.g. in the body of the e-mail message, text that provides a name for the project (e.g. "Project X") that is also identified by a label (e.g. "Project"). If this condition and other possible conditions of the rule are satisfied, the rule may include actions to create or edit project management objects in project management database 104 (or to trigger other project management tasks). For example, e-mail message 114 may trigger or cause the execution of a process for the creation of a new task object in project management database 104 that may be related to a project determined by a formula or procedure within rule 218. Rule 218 may include user-defined variable 222, which for example may require a user to specify a project name using a label with in an e-mail message sent to mailbox 212. Where the user provides data 118 and a label 119 within the e-mail message, that condition of the rule may be satisfied and the rule may the trigger execution of actions also specified by rule 218. As shown in FIG. 2A business rules engine 156 may process or parse e-mail messages according to rules using for example expression evaluator or formula compiler 230 and execution engine 232, e.g. to execute actions in creating or editing objects in project management database 104 and for performing other project management tasks. Expression evaluator 230 may be an expression evaluator which receives expressions written in well-defined syntax and turns them into running code or executable code. For example, the administrator may define that a project created via e-mail will have the name $ProjectVar+"(Created by E-mail)". This expression may be referred to as a formula and the compiler may turn this into executable code. The compiler may supports Boolean, string, and mathematical expressions, and also may allows calling a pre-defined set of functions. An e-mail message sender may include in a message (e.g. 114) label 119, such as "Project"

and data 118, such as "Project X" and the receipt of such information may trigger execution engine 232 to create a new task for "Project X" in project management database 104.

In one example of an embodiment of the invention, activation unit 202, mailbox creation unit 204, rule maker unit 206 business rules engine 158, parser 156, expression evaluator 230, execution engine 232, e-mail service elements (on server 128) and rules 160 may be software elements, (elements of executable computer program code) executed by the processors (e.g. 132, 134, 138, 140) of servers 122, 124, 128, 130, respectively. In such an example, memory 226, 224, 228, which may be memory, such as RAM memory, on each of servers 122, 124, 130, respectively, may store the elements of activation unit 202, mailbox creation unit 204, rule-maker unit 206, business rules engine 158, parser 156, expression evaluator 230, execution engine 232, and rules 160 on each of their respective servers 122, 124, 130. Memory 224 may also include domain 210, global mailbox 212 and entity mailbox 214 (and the other elements of project management database 104), as well.

Elements such as activation unit 202, mailbox creation unit 204, rule-maker unit 206 business rules engine 158, parser 156, expression evaluator 230, execution engine 232, and rules 160 may have also been downloaded from storage 228. For example, copies of activation unit 202, mailbox creation unit 204, rule maker unit 206 business rules engine 158, parser 156, expression evaluator 230, execution engine 232 and rules 160) may be downloaded and installed on memories 226, 224, 228 of servers 122, 124, 130, respectively, such that when installed the server memories 226, 224, 228 may include activation unit 202, mailbox creation unit 204, rule maker unit 206 business rules engine 158, parser 156, and rules 160. Storage 228 may be a storage device, which may include disk or server storage, portable memory such as compact disk (CD) memory and/or DVD memory and system memory, such as a hard drive or solid state drive (SSD) on which an e-mail center 106 copy may be installed. Storage 228 may represent a non-transitory computer-readable memory. Parser 156, or another unit, may parse or analyze an electronic message (e.g., an e-mail message, text message, etc.) received for example at a mailbox or inbox, locate a label or field identifier in the message. The label or field may correspond to a variable or other data item. The variable or other data item may be obtained or recorded. In response, a rule may be applied. An action may be taken or triggered, such as causing an update to a project management database of a project management application.

Figure 2B:
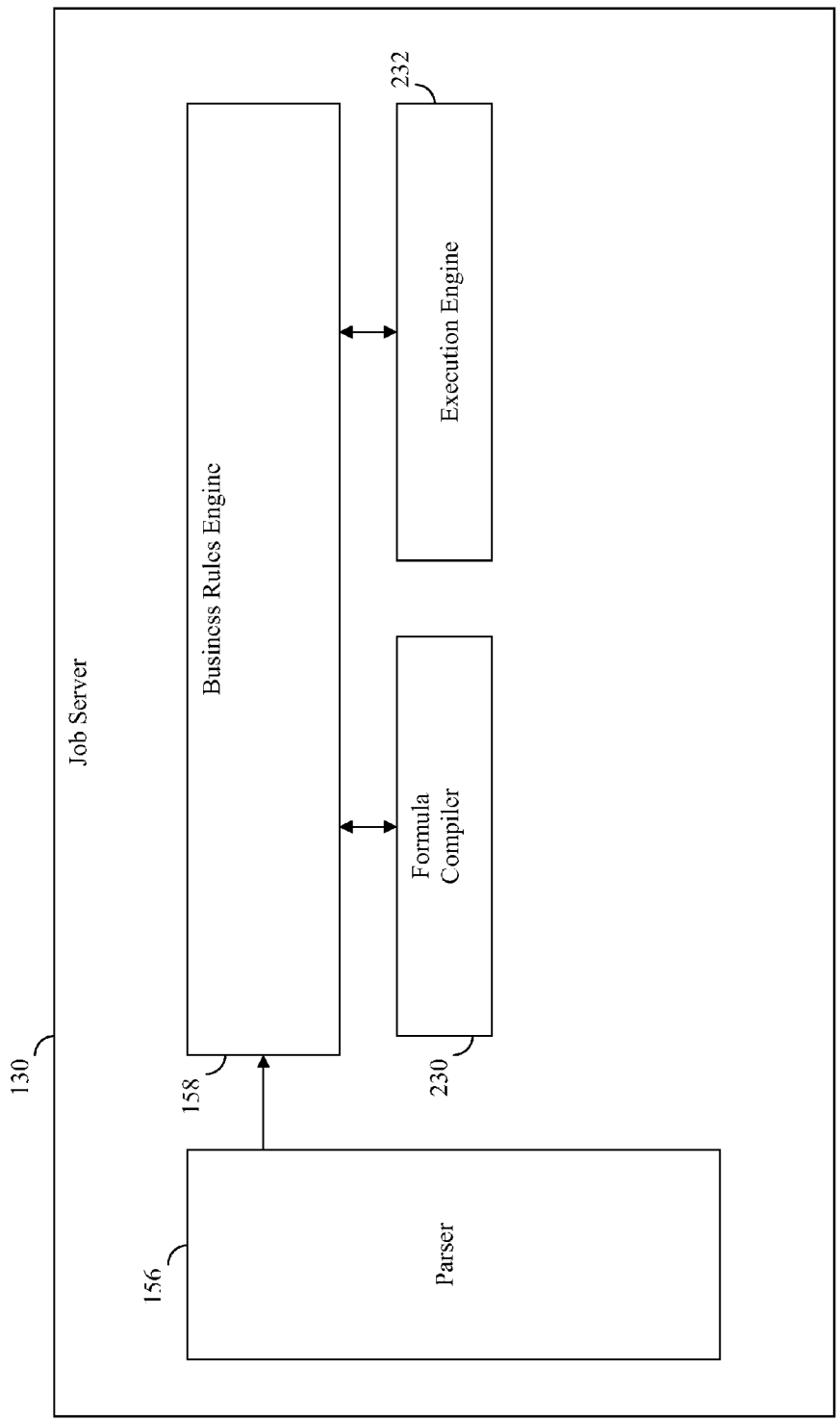
FIG. 2B illustrates elements of a job server, according to an embodiment of the invention.

Reference is now made to FIG. 2B, which illustrates elements of job server 130, according to an example embodiment. Job server 103 may include parser 156 (e.g. an e-mail message parser), business rules engine 158, expression evaluator 230 and execution engine 232. Parser 156 may be responsible for identifying the mailbox that is correct for the e-mail (e.g. the "New Tasks" mailbox for an e-mail addressed to NewTasks@XCorporation.host.com) and parser 156 may extract message parameters from the e-mail message (such as information from an e-mail message's "To" field, a "From" field, a "Subject" field and attachment links). Custom, user-defined parameters (custom data fields that may be defined in a rule) may also be extracted from the body of the message. For example, parser 156 may parse an electronic message received for a mailbox to locate a label for a variable in the received electronic message and thereby obtain data in the electronic message that corresponds to the variable. Parser 156 may pass the e-mail body (the message text of the e-mail) together with the extracted parameters to business rules engine 158.

Business rules engine 158 may evaluate all the rules that may be associated with the mailbox to which the e-mail message is addressed. Business rules engine 158 may evaluate the rules and determine based on information within the e-mail, which rule should be triggered. A rule, when triggered may define actions to take, or cause to be executed such actions, in creating or editing objects within project management database 104. Business rules engine 158 may perform or have executed the actions defined under the rule using data from the parameters extracted from the e-mail message. In evaluating the rules and in executing project management actions, business rules engine 158 may use expression evaluator 230 and execution engine 232 to perform tasks. Expression evaluator or formula compiler 230 may accept an expression and compile or translate it into one of several languages. (Execution engine 232 may process e-mail messages and may execute actions in creating or editing objects for project management application (and performing other project management tasks). Execution engine 232 may execute performance management system tasks such as adding an object (e.g. a new project, milestone or task object), updating fields (data held by objects), performing an outbound call, an HTTP call to an external web service and\or connection to a third party application, reschedule a date (related to an object), send a e-mail message, send an update request (related to an object), update other data fields in an object, link e-mail and other document attachments to the project management objects and perform other tasks.

Figure 3A:
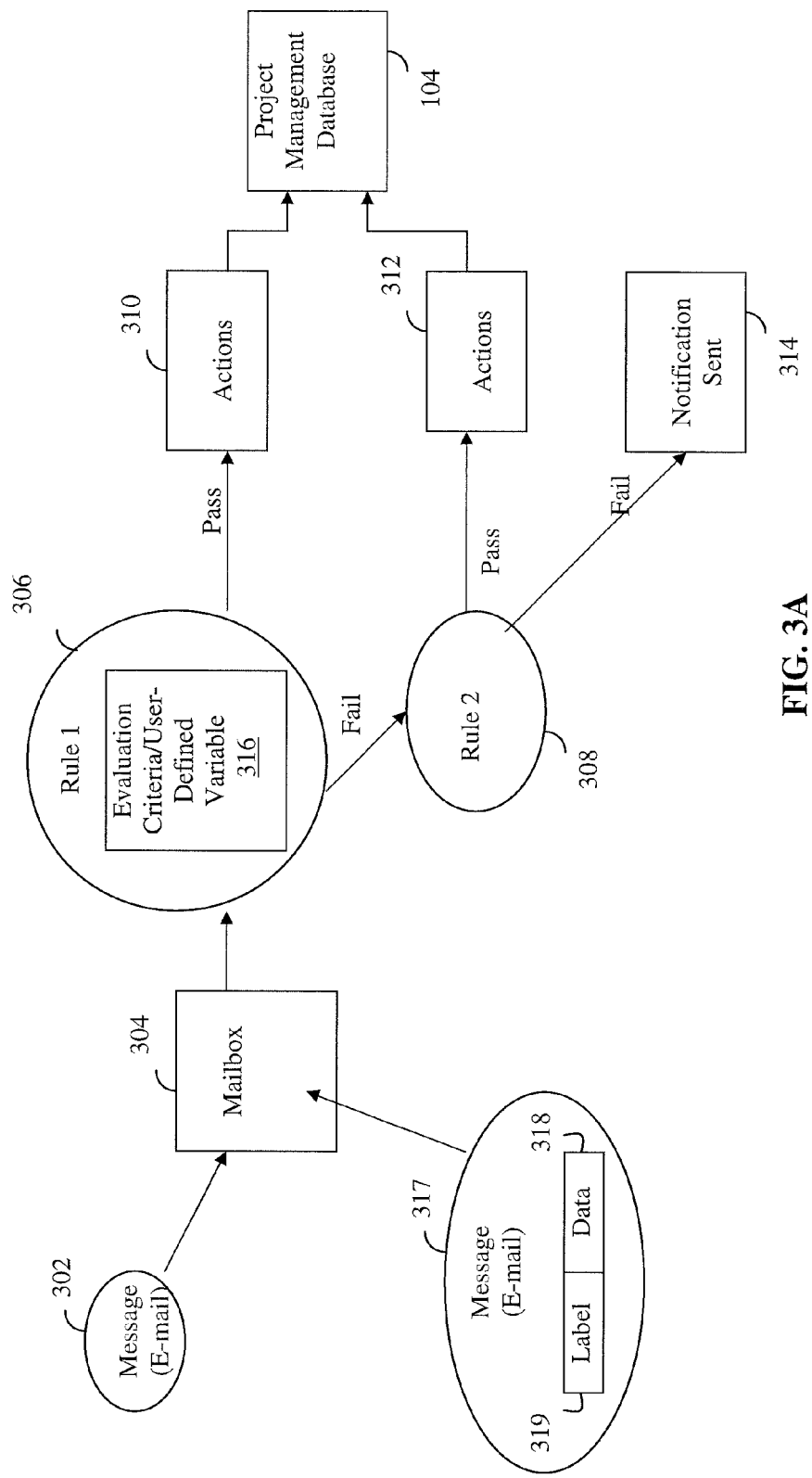
FIG. 3A illustrates elements of message for e-mail processing using rules, according to an embodiment of the invention.

Reference is now made to FIG. 3A, which illustrates elements of e-mail message processing using multiple rules, according to an example embodiment. In FIG. 3A, e-mail message 302 may be sent to e-mail center 106, addressed to mailbox 304. An administrator may have defined rules 306, 308, which may be associated with mailbox 304. Rules 306, 308 may require e-mail message 302 to have certain parameters (certain data requirements). If the e-mail message contains data that will satisfy the parameters of a rule, then the e-mail message will pass the rule and the actions associated with the rule will trigger to take action within project management database 104. As shown in FIG. 3A each of rule 306, 308 may trigger its own set of actions. Rule 306, if satisfied, may trigger actions 310 (e.g. create new task object, etc.). Rule 308, if satisfied, may trigger or cause the execution of actions 312 (e.g. create new milestone object, etc.).

Rule 306 in FIG. 3A may include user-defined variable and evaluation criteria 316. User-defined variable 316, for example, may require a user to specify a project name using one or more label(s) within an e-mail message sent to mailbox 304. The requirement of a project name with a label in the message may be a parameter that must be satisfied in rule 316. Evaluation criteria 316, for example, may be evaluated in order to determine whether the rule should be executed or not.

An end user (such as an employee or customer of an organization) may send e-mail message 302 to mailbox 304 (within e-mail center 106), where, for example, an administrator has created mailbox 304. E-mail message 302 upon arrival at e-mail center 106 may be routed (e.g. following the routings to servers shown in FIG. 1B) to queue(s) 154 for processing. Rules 306, 308 may be stored or otherwise associated with mailbox 304.

As shown in FIG. 3A, rules 306, 308 for mailbox 304 may be ordered for processing in a hierarchy. Each rule 306, 308 associated with a mailbox may be given a run order number, for example, where 1 may be the first rule to be applied by business rules engine 158 and where other rules are applied subsequently following the run order, e.g. 2, 3, 4, . . . etc. In one example, a hierarchy may be created for applying the rules to an electronic message received at the mailbox according to a pre-determined order. Following the hierarchy order, the rules may be applied to an electronic message received at the mailbox. When an electronic message received satisfies the data requirements of one of the applied rules (according to the one or more conditions of the rule) no further rules are applied.

However, if the first rule determined by the run order fails (e.g. because the e-mail does not contain data that satisfies the parameters of the rule), then the next rule following rule order numbering may be attempted in sequence by business rules engine 158, until business rules engine 158 find a rule whose parameters for triggering are met.

For example, message 302 (in this example an e-mail message) may arrive at mailbox 304, where rule 306 (the first rule in the hierarchy) has a requirement that that the message must specify a project name identified by a project label. Rule 308 does not have this requirement. E-mail message 302, as shown in FIG. 3A does not include the project name or label. By allowing end users to build sequencing rules such as this it may allow for a wider variety of scenarios and formats for the same mailbox. In the example above, one can choose to add a task and add it to a specific project (hence, supply a project as a parameter), while another may want to add a task, the task being added automatically to a default project (e.g., 'User's Action Items' project).

When message 302 is processed according to rule 306, the business rules engine 158 may check data parsed from message 302 to determine if a project name is provided (identified by a "Project" label). Rule 306 has a user-defined variable requiring data for a project name, and as such rule 306 has a parameter requirement for a project name that must be satisfied, in order trigger actions 310 in the project management database 104 (such as making a new task object for the identified project).

In the case e-mail message 302 does not contain a project name identified by a label, e-mail message 302 will not satisfy the parameters of rule 306. E-mail message 302 fails the specified conditions of rule 306. Following the order of the hierarchy of rules, business rules engine 158 may next apply rule 308 to e-mail message 302. As shown in FIG. 3A, rule 308 does not have a user-defined variable specified and thus rule 308 does not require a e-mail message to include a project name identified by a label. In this case, message 302 may satisfy the parameters of rule 308, and business rules engine 158 may then perform actions 312 specified in the rule (e.g., create new object, etc.) on the data for project management maintained in project management database 104.

If no rule is found to apply to the e-mail (e.g. the parameters for triggering of all the rules are not met), then business rules engine 158 may send notification 314 of the failure to the sender (who sent the e-mail) or the administrator (who created the mailbox and rules) or both.

The business rules engine 158 may apply rules within the hierarchy of rules, until the data parameter requirements of one of the rules are satisfied. For example in FIG. 3A, e-mail message 317 may arrive at mailbox 304 for processing, and e-mail message 317 may have in its body text data 318 for the name of a project ("Project X") and that text data may be identified by label 319 ("Project"). Business rules engine 158 using the hierarchy of rules may first apply rule 306, and, in this case, e-mail message 317 may satisfy the parameters of rule 306 (in that the data "Project X" may be input to user-defined variable 316). Upon satisfaction of the parameters of rule 306, business rules engine 158 may trigger actions 310 for rule 306, and then may end processing (and not apply rule 308).

Figure 3B:
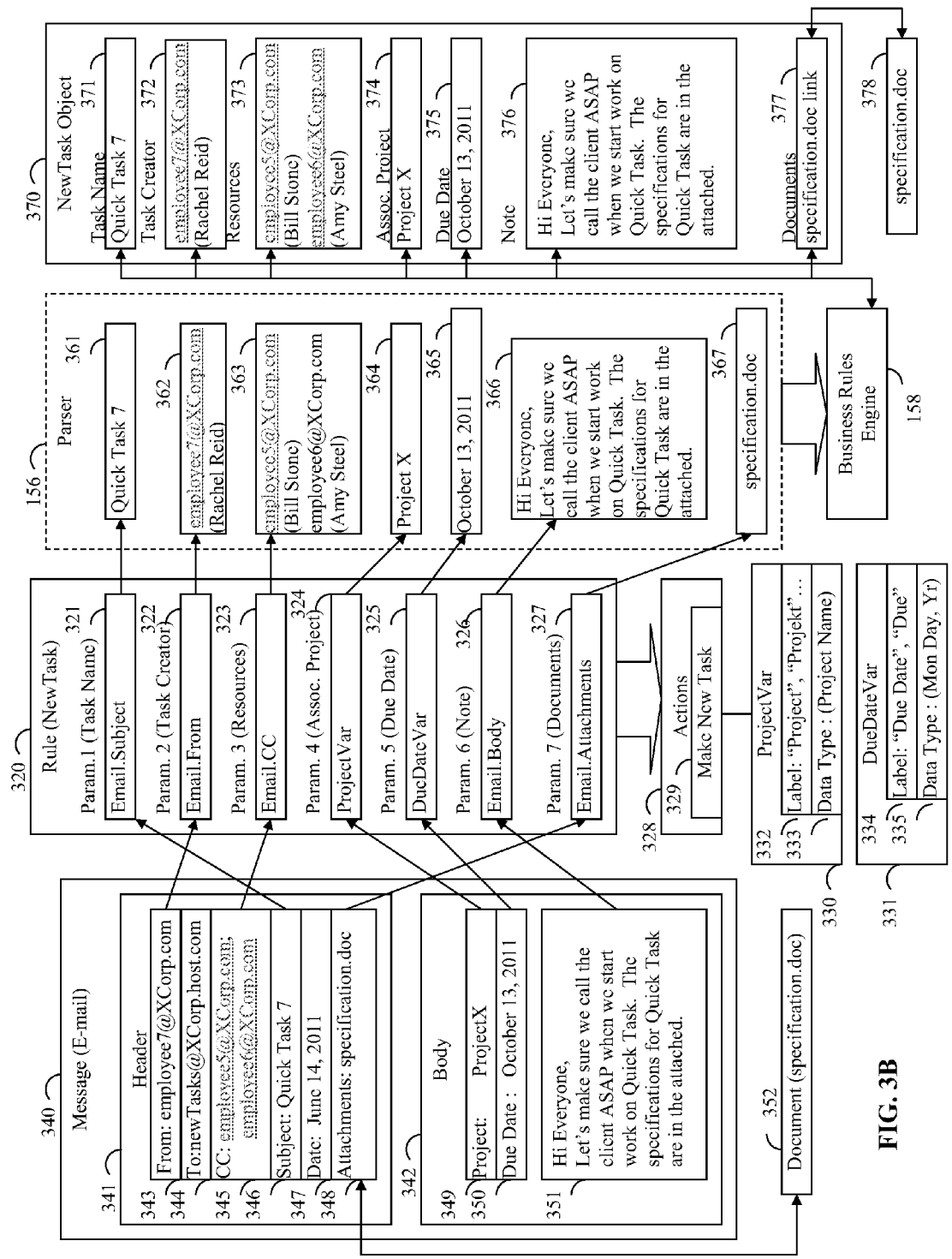
FIG. 3B illustrates elements of parsing and business rules engine execution, according to an embodiment of the invention.

Reference is now made to FIG. 3B, which illustrates the parameters of a mailbox rule and the operations of the parser and business rules engine in processing an e-mail message.

In FIG. 3B, rule 320 may create new task objects in project management database 104. Rule 320 may have been created by an administrator of XCorporation to allow employees and clients of XCorporation to generate new task object in project management database 104 using e-mail messages. Rule 320 may be created with a number of data parameters 321, 322, 323, 324, 325, 326 and 327, which must be filled with data from an in-coming e-mail. If parameters 321-327 can be filled with data (as satisfied by an incoming e-mail message), actions 328 may be triggered.

Parameter 321 may require that the new task be given a name. Parameter 321 may provide a variable "Task Name," and also may provide that the subject line of the e-mail message (E-mail.Subject) may be used as the input for the task name. A second parameter 322 may require the new task created also include a name of the task's creator. Parameter 322 may provide a variable "Task Creator," and also may provide that an identifier for the sender be provided to identify the task creator. In parameter 322, the code "E-mail.Sender" may provide that the e-mail address of the e-mail message sender be input into parameter 322. In one example, the e-mail address of the individual sending the e-mail message may be stored as the task creator. In another example, the e-mail address of the e-mail sender may be matched against a list of names (First name, last name), where the name corresponding to the e-mail address may then be stored as the task creator.

A third parameter 323 may require the task created also include the names of resources that may be employed to accomplish the new task. Resources may include individuals (employees, administrators, consultants, strategists, etc.) that may be assigned task-completion responsibilities. Parameter 323 may provide a variable "Resources" and also may provide that identifiers for the individuals assigned responsibilities for completing the new task be provided. In parameter 323, the code "E-mail.CC" may provide that the e-mail addresses of all individuals or entities copied (or CC'ed) on an e-mail message are input into parameter 323. The e-mail addresses from the CC Field of an e-mail message may then be used to identify the task resources. In one example the e-mail addresses from the CC Field of an in-coming e-mail message may be stored to identify the resources. In another example the e-mail addresses from the CC Field may be matched against a list of names (e.g., First name, last name), which then may be stored as the task resources.

A fourth parameter 324 may require the task created include a name for an associated project to which the new task belongs. Parameter 324 may provide a variable "Associated Project," and also may provide that data containing the name of the associated project be provided. In parameter 324, the code "ProjectVar" may identify a custom, user-defined variable that has been defined to obtain project name information for the rule. "ProjectVar" in parameter 324 may have definition specifics 330 that may be included in rule 320. Definition specifics 330 may include label 332 and data type 333. Label 332 may provide that a label such as "Project" or "Projekt" be used to identify the ProjectVar data. Definition specifics 330 may further provide that data for ProjectVar provided in the e-mail message have a specific data type. Data type 333 in this example may specify that the ProjectVar data must be of type "Project"—meaning that the data provided as the ProjectVar, must be a name, or alias, of a project recognized in the project management database 104 E-mail center 106 may provide an interface for variable definition by user-input in a rule to trigger an action within project management database 104, where the variable may be identified by a label and the label may be provided to signal a location of data for the variable in an electronic message. In other embodiments, other parameters may be used, and parameters such as task creator, identifiers for individuals, associated projects, or other parameters discussed herein, need not be used.

A fifth parameter 325 may require the task created also include a due date for completion of the new task. Parameter 325 may provide a variable "Project Due Date" and also may provide that data containing a due date for the new task be provided. In parameter 325, the code "DueDateVar" may identify a custom, user-defined variable that has been defined to obtain a project due date. "DueDateVar" in parameter 325 may have definition specifics 331 that may be included in rule 320. Definition specifics 331 may include label 334 and data type 335. Label 334 may provide that a label such as "Due Date" or "Due" must be used to identify the ProjectVar data. Definition specifics 331 may further provide that the data provided in the e-mail message may have a specific data type. Data type 335 in this example may specify a calendar date, such as "Month Day, Year—meaning that the data provided as the DueDateVar, must be appear as a date, such as Oct. 13, 2011 or 13\10\11. The date format will be based on the organization\user setting. A sixth parameter 326 may provide that the task created also include as a note the free text that may be found in the body of the e-mail message. Parameter 326 may provide a variable "Note," and also may provide that the e-mail message body text be provided as the note. In parameter 326, the code "E-mail.Body" may provide that the body text of the e-mail message be input into parameter 326. (And where text has been identified as data or label for a custom, user-defined variable, that text may be excluded from other free text, which may be used as the note.)

A seventh parameter 327 may provide that the task created also include as supporting documentation for the task any document file that may be attached to the message. Parameter 327 may provide a variable "Documents," and may also provide that any e-mail message attachments are associated as documents with the new task. In parameter 327, the code "E-mail.Attachments" may provide that links to the attachments of the in-coming e-mail message be input into parameter 327.

An e-mail message coming to the mailbox associated with rule 320 may be required to contain data that will satisfy the parameters set out in the rule. For example an employee of XCorporation (a user with permission to add a new task) may wish to create a new task for Project Z (which may be a project recognized in project management database 104).

The employee may create a new task in project management database 104 by sending e-mail message 340 to the mailbox associated with rule 320. The mailbox may have a name, such as NewTasks@XCorporation.host.com. E-mail message 340 may be defined following a format such as, for example, RFC 5322 (e.g. for sending across the Internet). In such an example, e-mail message 340 may include header 341 and body 342. Header 341 may include metadata data fields such as From Field 343, To Field 344, CC Field 345 (copies sent to field), Subject Field 346 (also known as a "regarding" or "RE" field), and Date Field 347. Attachment Field 348 may also be included and may contain links or references to files (e.g. documents or images), which may be sent with the e-mail to its destination. Body 342 may contain the message content of the e-mail (e.g. the message text). Included in body 342 may be free body text 351 (formatted, for example, as unstructured text). Body 342 may also include label data areas such as label area 349 (having data under the label "Project") and label area 350 (having data under the label "Due Date").

E-mail message 340 may be processed according to the parameters of rule 320 when it arrives at the mailbox NewTasks@XCorporation.host.com. For example, job server 130, using parser 156 and business rules engine 158 may process e-mail message 340. Parser 156 may access e-mail 340 and attempt to retrieve (or extract) from the data fields and body of e-mail message 340 the data required by the parameters of the rule.

For example, parser 156 may extract from e-mail message 340 the data from Subject Field 346 ("Quick Task 7"). That data may be required to satisfy the first parameter of rule 320 (parameter 321 for Task Name). Parameter 321 shows that data from E-mail.Subject is required. Data 361 shows extracted data: "Quick Task 7."

Parser 156 may extract from e-mail message 340 the data of From Field 343. That data may be required to satisfy the second parameter of rule 320 (parameter 322 for Task Name). Parameter 322 shows that data from E-mail.From is required. Data 362 shows extracted data employee7@XCorp.com. (In one example the data employee7@XCorp.com may be later matched against name records e.g. stored in a table in project management database 104 and an individuals name (e.g. "Rachel Reid"), which corresponds to the e-mail address in the table may be used as the task creator).

Parser 156 may extract from e-mail message 340 the data of CC Field 345. That data may be required to satisfy the third parameter of rule 320 (parameter 323 for project Resources). Parameter 323 shows that data from E-mail.CC is required. Data 363 shows extracted data "employee5@XCorp.com" and "employee6@XCorp.com". (In one example the data "employee5@XCorp.com" and "employee6@XCorp.com" may be later matched against name records e.g. stored in a table in project management database 104 and corresponding names (e.g. "Bill Stone," "Amy Steel") may be used as the resources for the new task.

Parser 156 may extract from the data in e-mail message 340 that can be identified by the label associated with the ProjectVar variable (parameter 324) defined in rule 320. The ProjectVar data may be required to satisfy the fourth parameter of rule 320 (parameter 324 for Associated Project). Parameter 324 shows that data for custom, user-defined variable ProjectVar is required. Data 364 shows extracted data "Project X." Parser 156 may parse the text in body 342 until it locates the label "Project," defined in the rule (see label definition 332). In e-mail message 340, the label may be found in data area 349. Parser 156 may find the data "Project X," in data area 349, for example, just after the label "Project" (where the label provides a signal of the location of the data). Data 365 ("Project X") may be later matched against a table of established project names in project management database 104.

Parser 156 may extract from e-mail message 340 the data that may be identified by the label associated with the DueDateVar variable (parameter 325) defined in rule 320. The DueDateVar data may be required to satisfy the fifth parameter of rule 320 (parameter 325 for Task Due Date). Parameter 325 shows that data for custom, user-defined variable DueDateVar is required. Data 365 shows extracted data "Oct. 13, 2011." Parser 156 may parse the text in body 342 until it locates the label "Due Date," defined in the rule (see label definition 334). In e-mail message 340, the label may be found in data area 350. Parser 156 may find the data, "Oct. 13, 2011," in data area 350, for example, just after the label "Due Date" (where the label provides a signal of the location of the data). Data 365 ("Oct. 13, 2011") may be later checked for the required date format, e.g. month day, year, to ensure that the data provided is a legitimate date.

Parser 156 may extract further text from body 342 in e-mail message 340 as note information. That data may be required to satisfy the sixth parameter of rule 320 (parameter 326 for Note). Parameter 326 shows that data from E-mail.Body is required. Data 366 shows extracted text data "Hi Everyone, Let's make sure we call the client ASAP . . . . " (In one example the text from data areas 348, 350 in body 342 may be excluded as that text may be parsed for the ProjectVar and DueDateVar variables.

Parser 156 may extract from e-mail message 340 the attachment links found in Attachment Field 348. Those links may be required to satisfy the seventh parameter of rule 320 (parameter 327 for Documents). Parameter 327 shows that the data from E-mail.Attachments is required. Data 367 shows a link (or file reference) to the file 352 ("specification.doc") which may be an attachment to e-mail 340. File 352 may be used as a supporting document for the new task object.

While certain fields, data and parameters are discussed with respect to rules and a parser, other or different fields, data and parameters may be used.

Business rules engine 158 may check data 361, 362, 363, 364, 365, 366 and 367 collected by parser 156 to determine if the collected data satisfies the parameters set forth in rule 320. In one embodiment, a rule may be satisfied if the data for the rule simply exists in the message, e.g., if a set of parameters or variables exist in the message.

In another embodiment, a rule may be satisfied if a set of parameters or variables fall within a range or match certain pre-defined requirements.

In one specific example, for parameter 321 (Task Name), business rules engine 158 may check data 361 to determine if text has been entered.

For parameter 322 (Name of Task Creator), business rules engine 158 may check data 362 to determine if an e-mail address has been extracted and if that address may correspond to a name of a user within project management database 104 (such as Rachel Reid).

For parameter 323 (Names of Resources), business rules engine 158 may check data 363 to determine if one or more e-mail addresses have been extracted and if those addresses may correspond to names of users within project management database 104 (such as Bill Stone and Amy Steel).

For parameter 324 (Name of Associated Project), business rules engine 158 may check data 364 to determine if the text found as the ProjectVar (the custom, user-defined Project Name variable) matches the name of a project that has been established in project management database 104.

For parameter 325 (Task Due Date), business rules engine 158 may check data 365 to determine if the data found as the DueDateVar (the custom, user-defined Due Date variable) matches the specified format for a date (e.g. month, date, year).

For parameter 326 (Text of Note), business rules engine 158 may check data 366 to determine if there is extracted text to create a note for the new task object.

For parameter 327 (Links to Associated Document), business rules engine 158 may check data 367 to determine if there are attachment links.

In defining the parameters of rule 320 it is possible, that some of the parameters may be designated as mandatory or required and other may be designated as non-mandatory or not required. For example, the administrator in defining rule 320 may have designated parameter 324 (for Associated Project) as mandatory. In such an example, if the label for the ProjectVar is not found in the e-mail message or the data provided is not the name of a recognized project in project management database 104, then the parameter requirement for a Project Name may not be satisfied and the rule may fail (with no actions being applied). In such a case, since the sender has used the appropriate rule format, the system may return an error message such as an e-mail message to the sender with specification of the error (e.g.: project not found), so that user will be able to fix that and resend that e-mail. In various embodiments, error messages (e.g., e-mail messages) may be sent to a user if mandatory parameters are missing, parameters include the wrong format, the user is not permissioned, known, or licensed, the user lacks sufficient permissions for the requested operation, a quota has been exceeded (e.g., the organization has reached the amount of allowed e-mail messages, for example per day), the e-mail address does not exist, or there is some other error, e.g., a runtime error.

In the example of FIG. 3B, the administrator may have specified that parameter 327 (for Attachment Documents) may be non-mandatory, and in such a case the rule would not fail even if no attachment links were found in the in-coming e-mail message.

After checking data 361-367 extracted by parser 156 and determining that the parameters are valid for rule 320, business rules engine 158 may then trigger actions that are specified by rule 320. Actions 328 shows one action 329 (Make New Task) that business rules engine 158 (e.g. using execution engine 232) may execute upon determining that the data parameters have been satisfied by the data of the in-coming e-mail message.

Business rules engine 158 (e.g. using execution engine 232) may trigger in project management database 104 the creation of new task object 370. New task object 370 may include fields 371, 372, 373, 374, 375, 376 and 377.

New task field 371 may contain the task name ("QuickTask 7" from extracted data 361).

New task field 372 may contain an identifier for the task creator (e.g., an e-mail address, employee7@XCorp.com, and/or an employee name, like Rachel Reid, from extracted data 362)

New task field 373 may contain identifiers for resources associated with the task (e.g. the e-mail addresses or names of the employees, consultants or others who may be responsible for completing the new task, from extracted data 363).

New task field 374 may contain the name of a project to which the new task is associated (e.g. "Project X" from extracted data 364). Corresponding parameter 324 may have been specified as mandatory.

New task field 375 may contain a due date for completion of the new task (e.g. "Oct. 13, 2011" from extracted data 365). Corresponding parameter 326 may have been specified as mandatory.

New task field 376 may contain a text for a note related to the new task (e.g. the body text from extracted data 366). Corresponding parameter 326 (for a new task note) may have been specified as non-mandatory.

New task field 377 may contain links to documents associated with the new task (e.g. specification documents, such as specification.doc file 378). Corresponding parameter 327 (for new task documents) may have been specified as non-mandatory.

Figure 4A:
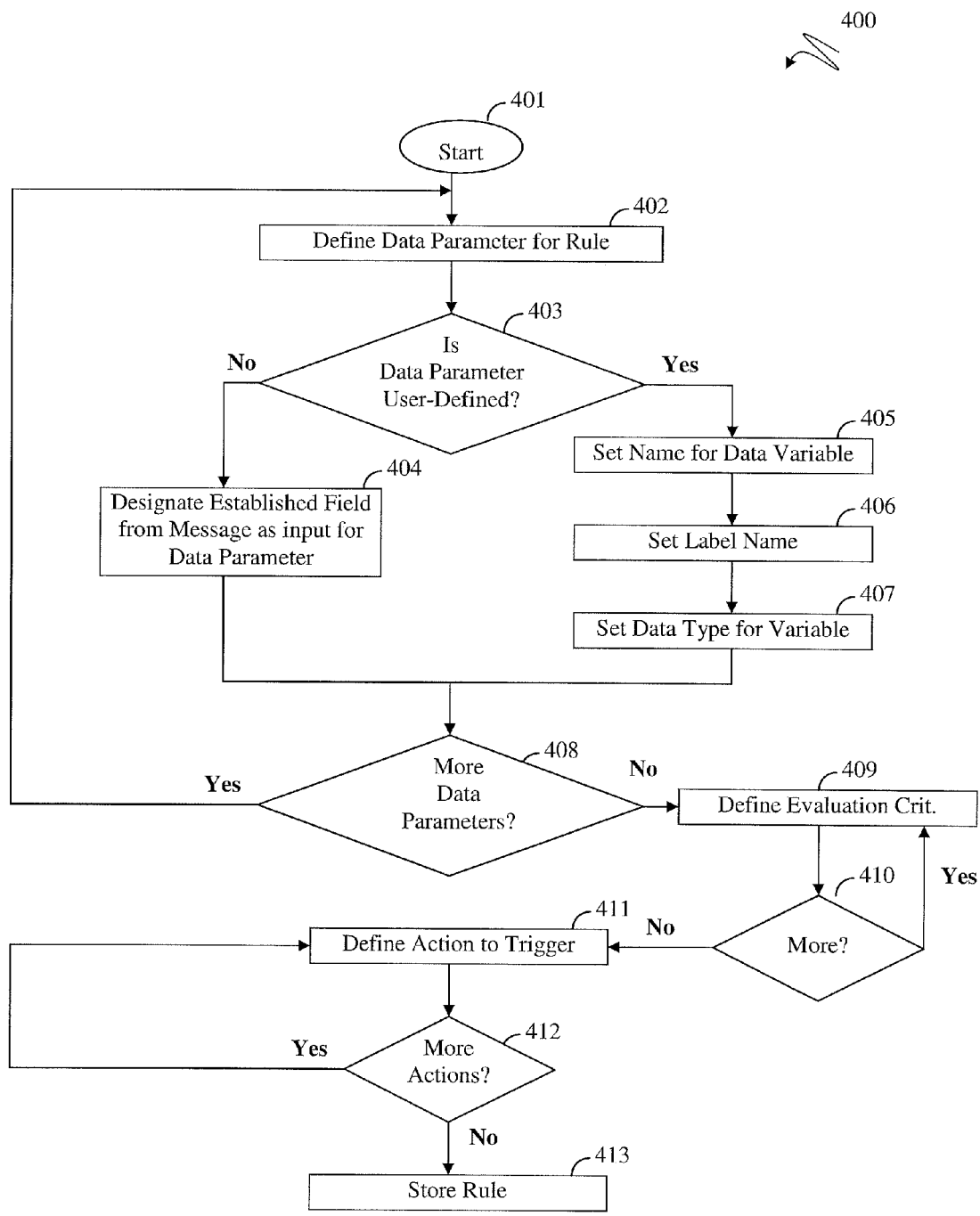
FIG. 4A illustrates a process for making a rule, according to an embodiment of the invention.

FIGS. 4A-4D illustrate processes for updating a project management application database, according to an embodiment of the present invention. Reference is now made to FIG. 4A, which illustrates an example process 400 for generating a rule (such as rule 320), according to an embodiment of the invention. The operations of process 400 may be executed, for example by processor 132 operating rule-maker unit 206.

In operation 401, process 400 may start. In operation 402, process 400 may include defining a data parameter for the rule. As shown in FIG. 3B, rule 320 may be created with a number of data parameters 321-327, which may be filled with data from an in-coming e-mail. In operation 403, rule-maker unit 206 (performing process 400) may determine if a user (such as an administrator defining the rule) wishes to create a custom, user-defined data parameter for the rule. As stated, rules may be user-created and may include data parameters customized by the user. Operation 403 may include providing an interface for variable definition by user-input in a rule to trigger an action within the project management database, where a variable may be identified by a label and the label may be provided to signal a location of data for the variable in an electronic message.

If in operation 403, the user does not wish to create a custom, user-defined parameter for the rule, rule-maker unit 206 (performing process 400) may proceed to operation 404, where the user may designate an established message field as input for the new parameter. As shown in FIG. 3B an electronic message such as e-mail message 340, may include data fields established by the message format such as From Field 343, To Field 344, CC (copied to) Field 345, Subject Field 346, Date Field 347, Attachment Field 348 and Body 342. An established field from a message may be designated with a code such as "E-mail.Subject" or "E-mail.CC," depending on the data that is to be collected from the electronic message.

If in operation 403, the user does wish to create a custom, user-defined parameter for the rule, rule-maker unit 206 (performing process 400) may proceed to operations 405-407, where the user may set a name for the custom, user-defined variable, such as "ProjectVar" or "DueDateVar" (in operation 405), set a label name for the variable, such as "Project" or "Due Date" (in operation 406) and set a data type for the data required in the custom, user defined variable, such as "project" data type or a date format data type such as "month day, year" (in operation 407). It is noted that in setting the label name (in operation 406) the user may provide a number of different labels which parser 156 and business rules engine 158 may use to locate data. For example a label for project may be specified in many different languages such as "Project", "Projekt", or for example for a due date, it can be: 'Due Date', 'End Date', 'Due by', etc., to allow e-mail message senders who may communicate in different languages/terms to send information by e-mail that will comply with the rule, all within the same rule and same organization In operation 408, rule-maker unit 206 (performing process 400) may check to determine if the user wishes to create more data parameters in the rule. If the user would like to create more data parameters, rule-maker unit 206 may return to operation 402 and perform again operations 402-407 while the user defines more data parameters.

If in operation 408, the user does not wish to define any further data parameters, rule-maker unit 206 may proceed to operation 409 to allow the user (such as an administrator) to define evaluation criteria Evaluation criteria may include criteria according to which the system may determine whether the particular rule should be executed (e.g., trigger an action) or not.

If in operation 410, the user does not wish to define any further evaluation criteria, rule-maker unit 206 may proceed to operation 411 to allow the user (such as an administrator) to define one or more actions that may be triggered if an electronic message contains all of the data parameters defined by the rule. As stated, a rule may specify that one or more actions be taken in project management database 104 when the data parameters of the rule are satisfied (all of the data parameters are filled) by the incoming electronic message. For a rule such as rule 320, which may be associated with a mailbox such as NewTasks@XCorporation.host.com, one action may be to create a new task object in project management database 104. Other actions may be specified. Multiple actions, too, may be specified by the rule such as: 1) create new task object and 2) alert employees that the new task has been created.

In operation 411, the action may be defined, such as for example, by selecting the action from a list of possible actions provided by rule-maker unit 206 of project management application 102. Each action, for example, may have data requirements that may need to be satisfied by the data parameters of the rule (see, e.g. new task object 370, which was created from data required by the parameters of rule 320). In operation 412, rule-maker unit 206 (performing process 400) may determine if the user wishes to add more actions for triggering by the rule. If the user does wish to add more actions, rule-maker unit 206 may return to operation 411 to allow the user to define another action. If in operation 412 the user does not wish to add more actions to the rule, rule-maker unit 206 may store the created rule in operation 413 (and that rule may also be associated with a mailbox such as NewTasks@XCorporation.host.com).

Figure 4B:
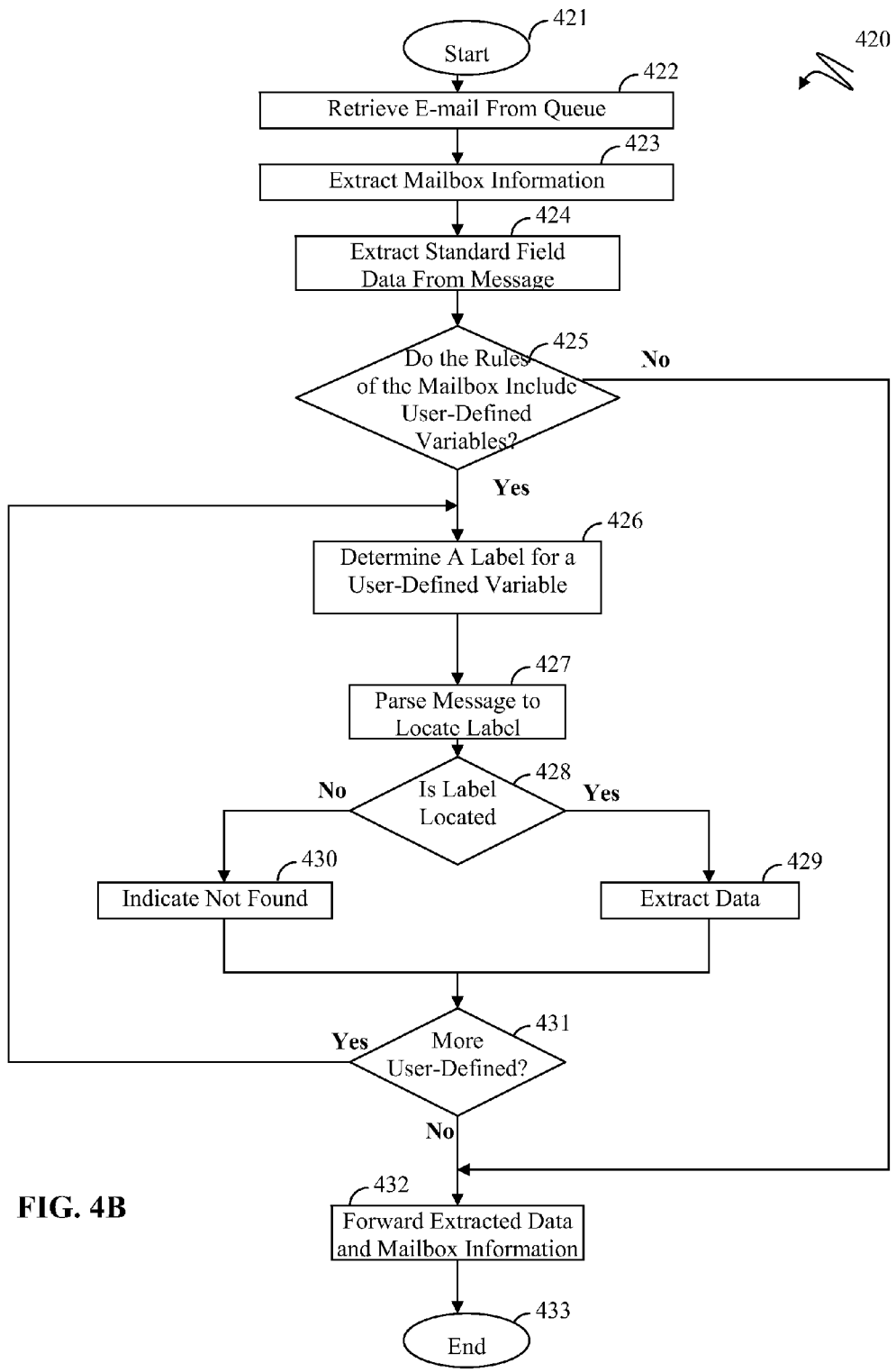
FIG. 4B illustrates a process for parsing an electronic message that is an e-mail message, according to an embodiment of the invention.

Reference is now made to FIG. 4B, which illustrates process 420 for parsing data for rule application. Processor 140 executing the procedures of parser 156, for example may perform process 420. An electronic message, such as e-mail message 340 may be received with a mailbox address, such as NewTasks@XCorporation.host.com. A rule such as rule 320 may be associated with the mailbox. Referring to FIG. 4B, process 420 may begin in operation 421 and in operation 422, parser 156 (performing process 420) may retrieve from queue(s) 154 e-mail message 340, such as for example a message addressed to NewTasks@XCorporation.host.com. In operation 423, parser 158 (performing process 420) may extract the mailbox information from the e-mail message (e.g. retrieving the address information NewTasks@XCorporation.host.com to determine that the e-mail message is addressed to the New Tasks mailbox).

In operation 424, parser 158 (performing process 420) may further extract standard fields, such as the To Field and Subject Field, from the received message. As stated, an electronic message, e.g. such as a message following a format such as RFC 5322 may include established (standard) fields such a From Field, To Field, CC Field (copies sent to field), Subject Field, Date Field, Attachment Field and message Body (see 341-348 and 342, FIG. 3B). In operation 424, the information from those fields may be extracted and retained.

In operation 425, parser 158 may determine if the rules associated with the mailbox may include any user-defined variables. A rule, such as for example rule 320, may include parameters that have custom, user-defined variables. As shown in FIG. 3B, parameter 324 includes a user-defined variable "ProjectVar" and parameter 325 includes a user-defined variable "DueDateVar". If the parameters of rule associated with a mailbox include custom, user-defined variables (e.g. like parameters 324, 325), it may be necessary for parser 156 to search (or parse) the message body to locate the data for those variables. Although in this example only one rule (rule 320 is associated) with the mailbox, in other examples more than one rule may be associated with a mailbox. In operation 425 of FIG. 4B each associated rule is checked to determine if any rule parameters include custom, user-defined variables.

If in operation 425 no rule associated with the mailbox includes a custom, user-defined variable, then the parser 156 in performing process 420 may move to operation 432 to complete the parsing process. In operation 432, parser 156 may forward the extracted data (the extracted standard fields) and the extracted mailbox information to business rules engine 158 for further processing, and in operation 433 parser 156 may terminate processing.

If in operation 425 a custom, user-defined variable is associated with a rule of the mailbox, then parser 158 (performing process 420) may proceed to operations 426-431 to extract data for the corresponding user-defined variable. In operation 426, parser 158 may identify the label that has been defined for the user-defined variable. In operation 427, parser 158 (performing process 420) may, for example, parse the body of receive e-mail message to locate the label within that message body.

If in operation 428 a label is located (for example if for ProjectVar, the parser finds the label "Project" or "Projekt" in the message body, parser 156 (performing process 420) may in operation 428 extract data from the message body that corresponds to the found label. The label may provide to signal for the location of data. For example, in Body 342 of message 340 in FIG. 3B, data area 349 may include the text "Project: Project X." Upon locating the label "Project" in operation 427, parser 156 may (in operation 429) extract the data after the label (e.g. the text "Project X") and retain that data for the ProjectVar variable.

If in operation 428, parser 156 finds no label, parser 156 (performing process 420) may in operation 430 create an indication that no data corresponding to the user-defined variable was found in the message. For example, if the label "Project" or "Projekt" was not found in the body of the e-mail message, parser 156 may store indicator for "not found" with the identified ProjectVar variable.

If in operation 431, parser 156 (performing process 420) determines that there are more user-defined variables to process, parser 156 may return to operations 426-431 to locate, if possible, data to correspond to those variables in the body of the received message.

If in operation 431, parser 156 (performing process 420) determines that there are no more user-defined variables to process, parser 156 may proceed to operation 432 to complete the parsing process. In operation 431, parser 156 may forward the extracted data (the extracted standard fields, extracted data for the custom, user-defined fields and the message body) and the extracted mailbox information to business rules engine 158 for further processing. In operation 432, parser 156 (performing process 420) may terminate operation.

Figure 4C:
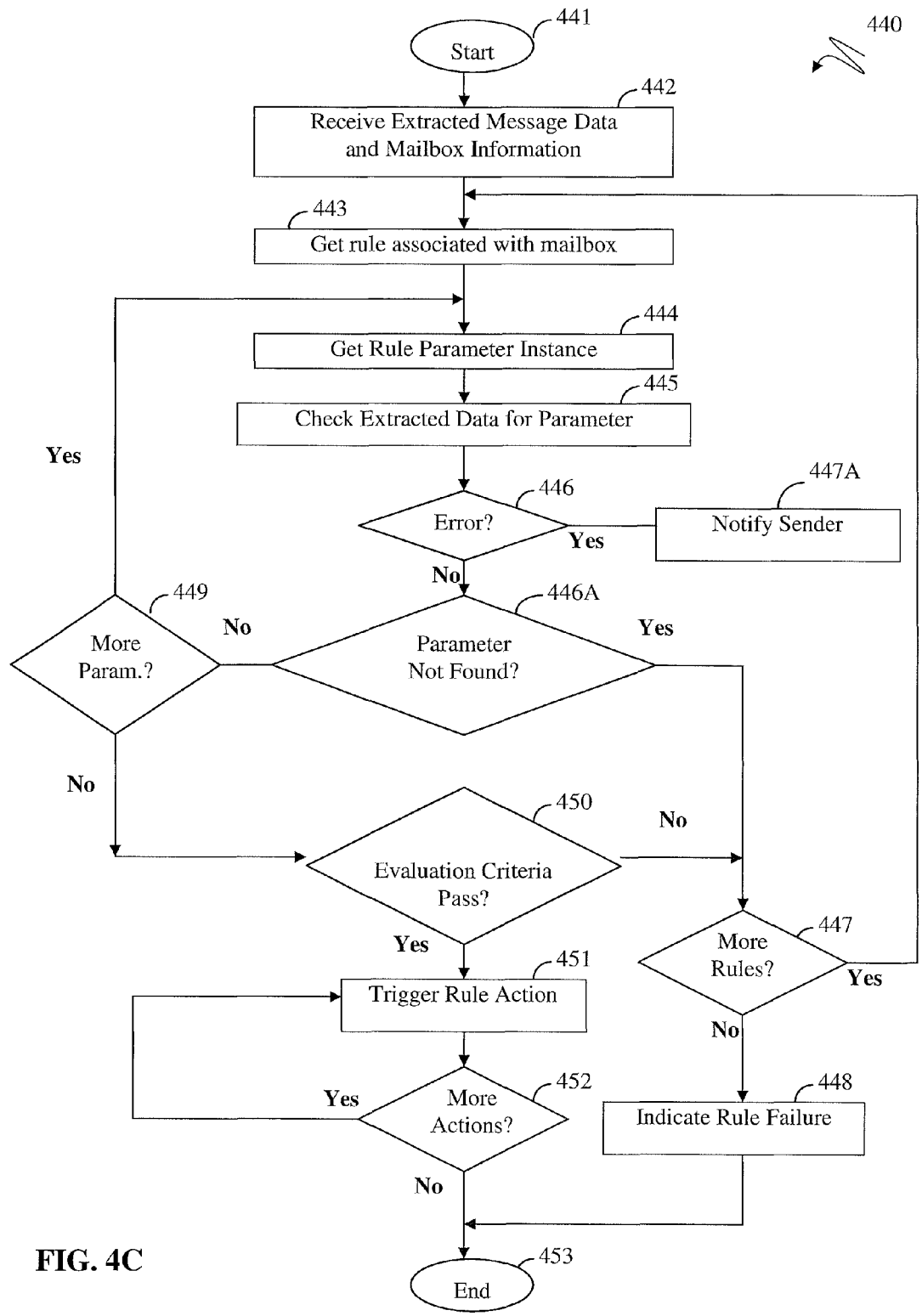
FIG. 4C illustrates a process for applying a rule to data parsed from an electronic messages, according to an embodiment of the invention.

Reference is now made to FIG. 4C, which illustrates process 440 for performing a rules analysis and action triggering. A rules analysis may be performed for example by processor 140, executing the procedures of business rules engine 158 and execution engine 232. In operation 441, process 440 may start. In operation 442, business rules engine 158 (e.g. performing process 440) may receive extracted message data and mailbox information (e.g. as was forwarded by parser 156 in operation 432 of FIG. 4B). In operation, 443, business rules engine 158 may retrieve a rule that may be associated with the mailbox (based on the received mailbox information).

As stated, a mailbox may have associated with it a number of rules that may be ordered for processing in a hierarchical order. Initially, to execute operation 443, business rules engine 158 may retrieve the first rule from the rules hierarchy. In operation 444, business rules engine 158 (performing process 440) may get a data parameter for the retrieved rule. For example in rule 320 of FIG. 3B, the parameter 321 (the first parameter) requires data for a task name, which is defined in the rule to be supplied by the subject line of the e-mail message.

In operation 445, business rules engine 158 may check the received extracted data to determine if data for the parameter in question is available. If no data is available for the parameter, then an error may be found in operation 446, and the rule is determined to have failed. If an error is found in operation 446 (e.g., a permissioning error, an invalid format for a parameter, a non-existing object, etc.), business rules engine 158 (performing process 440), may proceed to operation 447A, and send a message, such as an e-mail message, to the sender. If no error is found, in the case in operation 446A that expected parameters are not found, business rules engine 158 may move to operation 447 and may determine if there are more rules to process (more rules in the rule hierarchy for the mailbox). If in operation 447 there are more rules to process, business rules engine 158 may return to operation 443 to get the next rule in the hierarchy associated with the mailbox and attempt to perform operations 444-450 for that mailbox. If at operation 447 there are no more rules to process and all of the rules have failed, then business rules engine 158 may signal a rule failure in operation 448 (such as by sending an e-mail message concerning the failure to the e-mail message sender) and process 440 may terminate in operation 453.

If in operation 446A, the parameters are found and the parameter in question may be satisfied by the extracted data (for example for parameter 321 of rule 320, the subject line of the e-mail message, E-mail. Subject, has been extracted by parser 156), then in FIG. 4C, business rules engine 158 (performing process 440) may determine in operation 449 if there are more parameters of the current rule to check to ensure that the data required by each rule parameter can be furnished by the data extracted from the e-mail message.

If in operation 449 there are more parameter instances, business rules engine 158 (performing process 440) may return to operation 444 to get the next parameter for processing and then perform operations 445, 446, 449 to determine if the data extracted from the e-mail message can satisfy the requirements of the additional parameters. If data is not available for any of the additional parameters the rule will fail in its application (see operations 447, 448).

If in operation 449, there are no more parameters to check, and the data requirements of all of the parameters of the rule have been satisfied by the extracted data from the e-mail message, in operation 450, it may be determined if per the evaluation criteria of the rule, the rule should be executed. If the answer is yes, then business rules engine 158 may trigger execution of the rule, for example by invoking execution engine 232 (operation 451). If the answer is no, in operation 447 it may be determined if there are more rules to process.

In operation 451, execution engine 232 (now performing operations 451 and 452 of process 440) may perform an action that has been specified by the rule in question. For example, rule 320 of FIG. 3B, includes action 329 ("Make New Task"), which may be performed when business rules engine 158 determines that data for each of parameters 321-327 is available. After an action is triggered, a confirmation message may be sent to a user (e.g., via e-mail) notifying the user that the action has been triggered. In one embodiment, a confirmation message is sent prior to the trigger of the business rule, but after the identification of the mailbox and rule that will run. Confirmation may be requested, for example before a rule is actually triggered. For example, a confirmation message may include a confirmation URL or other feedback request or link, the rule name, a description, parameters and the values of the parameters as sent by the end user. The end user may review to ensure the data is correct and click the URL to confirm the action. In operation 451, execution engine 232 may perform the action for the rule whose actions were triggered (e.g. Make New Task), and then in operation 452, execution engine 232 may determine if there are more actions specified by the rule. If; in operation 452, execution engine 232 determines there are more actions to perform, execution engine 232 may return to operation 451 to get the next action and perform it. If in operation 452, execution engine 292 (performing process 440) determines there are no more actions to perform, then execution engine 292 may stop processing and process 440 terminates in operation 453 with possibly a success message (e.g., an e-mail message) being sent back to the sender (depending on the administrator definition).

Figure 4D:
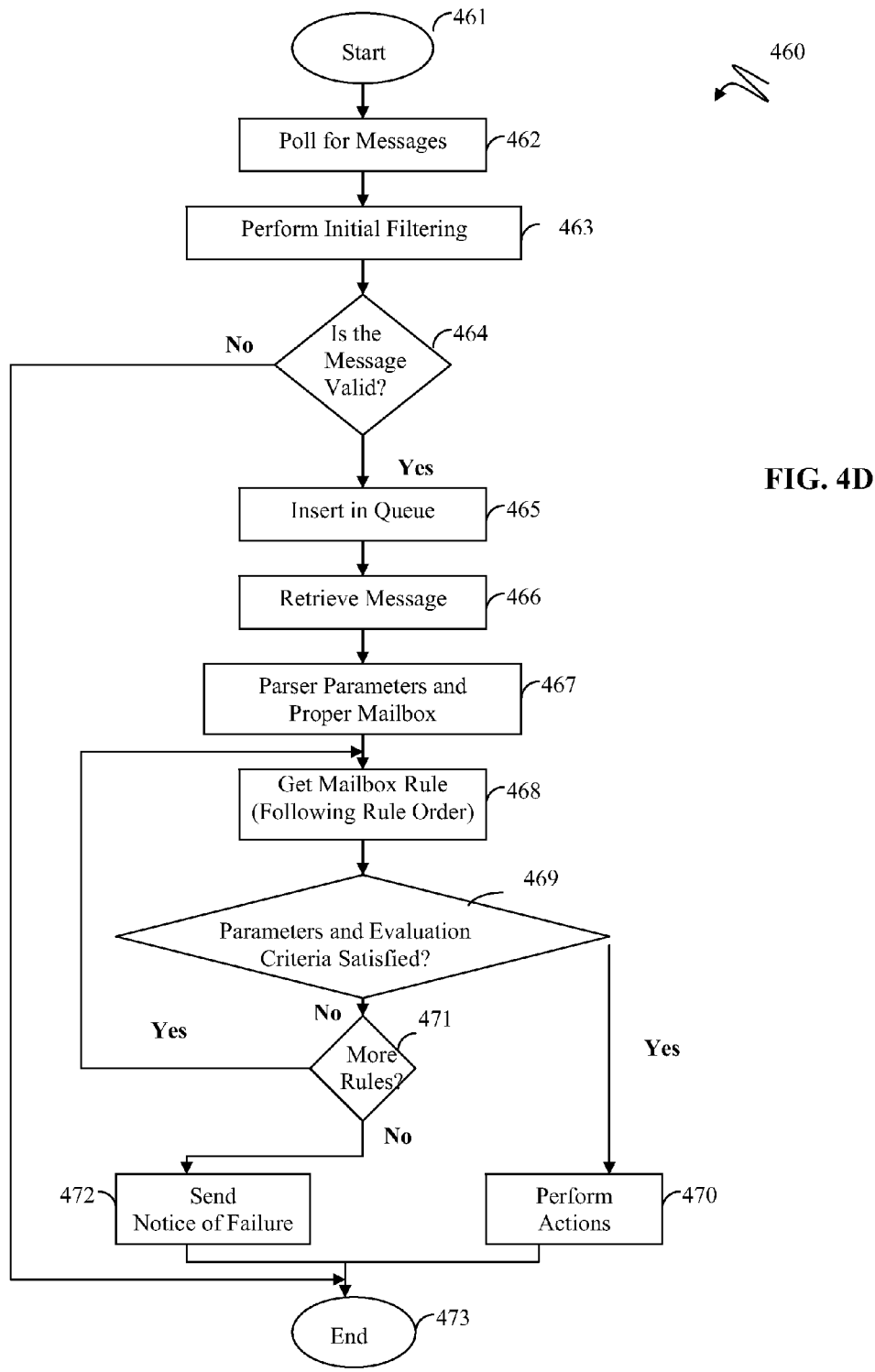
FIG. 4D illustrates a process for rule execution, according to an embodiment of the invention.

Reference is now made to FIG. 4D, which illustrates an example overall process 460 for e-mail processing and rule execution according to an embodiment of the invention. In operation 461 the process begins and in operation 462, process 460 may poll for new a message (e.g. gather an incoming message that may have been received by server 126 (e.g. POP3 server)). In one example, e-mail service server 128 may execute operation 462. In operation 463 e-mail service server 128 may perform initial filtering to determine if a received message is valid. The e-mail service server may check if the message arrived from an e-mail address that is known to the system (e.g., an e-mail address of an existing user within the system). It also may determine if the target domain belongs to an organization which has the e-mail center enabled. If in operation 464, the message is determined to be not valid, e-mail service server 128 (performing operation 464 of process 460) may terminate processing (e.g. at operation 473). If in operation 464, e-mail service server 128 determines the message is valid, process 460 may proceed to operation 465 and may enter the message onto queue(s) 154.

In operation 466, process 460 may retrieve the message from queue(s) 154. Parser 156 of job server 130 may perform such an operation, for example. In operation 414, parser 156 (performing process 460) may parse the e-mail to determine the mailbox that corresponds to the e-mail and also to extract standard, established fields and any user-defined parameters that may be found in the e-mail message. Parsing may be performed in operation 467, for example, following the operations of procedure 420 of FIG. 4B. The extracted data and mailbox information may be passed, for example, to business rules engine 158.

In operation 468, business rules engine 158 (now performing operations 468-472 of process 460) may retrieve a rule that is associated with the mailbox of the e-mail message (e.g. following the rule order). Business rules engine 158 in operation 469 may determine if the parameters found in the e-mail satisfy the conditions of the rule and if the evaluation criteria indicate that the rule should be executed so that the actions of the rule may be triggered. In performing operation 469, business rules engine may follow, for example operations 442-450 of procedure 440 described with reference to FIG. 4C.

If in operation 469, the parameters and evaluation criteria of the e-mail message satisfy the conditions of the rule, process 460 may proceed to operation 470, where the actions of the rule may be executed (e.g. by execution engine 232). In performing operation 470, execution engine 232 may follow, for example operations 451 and 452 of procedure 440 described with reference to FIG. 4C. Thereafter, processing may terminate at operation 473. If in operation 469, the parameters or evaluation criteria of the e-mail do not satisfy the conditions of the rule in question, business rules engine 158 (performing process 460) may then proceed to operation 471 to determine if there are more rules to process (e.g. following the rule order of the mailbox). If in operation 471, there are more rules, business rules engine 158 may return to operation 468 to get another rule to evaluate (e.g. the next rule following the rule order).

If in operation 471, there are no more rules, business rules engine 158 may proceed to operation 472, where business rules engine 158 may send an e-mail message concerning the processing failure of the e-mail at the mailbox to either the sender or the mailbox (and rule creator) or both. In operation 473 processing may terminate.

In different embodiments e-mail center 106 may allow a business or other organization to perform functions such as: activating a message center, such as e-mail center 106; creating a new mailbox; adding rules to a mailbox; creating rules for object/entity types (such as rules for all project objects, task objects, etc.); automating processes for receiving case information (such the receipt of a support request through e-mail); exporting vCard or other contact information to a user; and packing mailboxes, related rules and custom variables into applications for distribution, for example via a marketplace.

Activating the Message Center

Figure 5A:
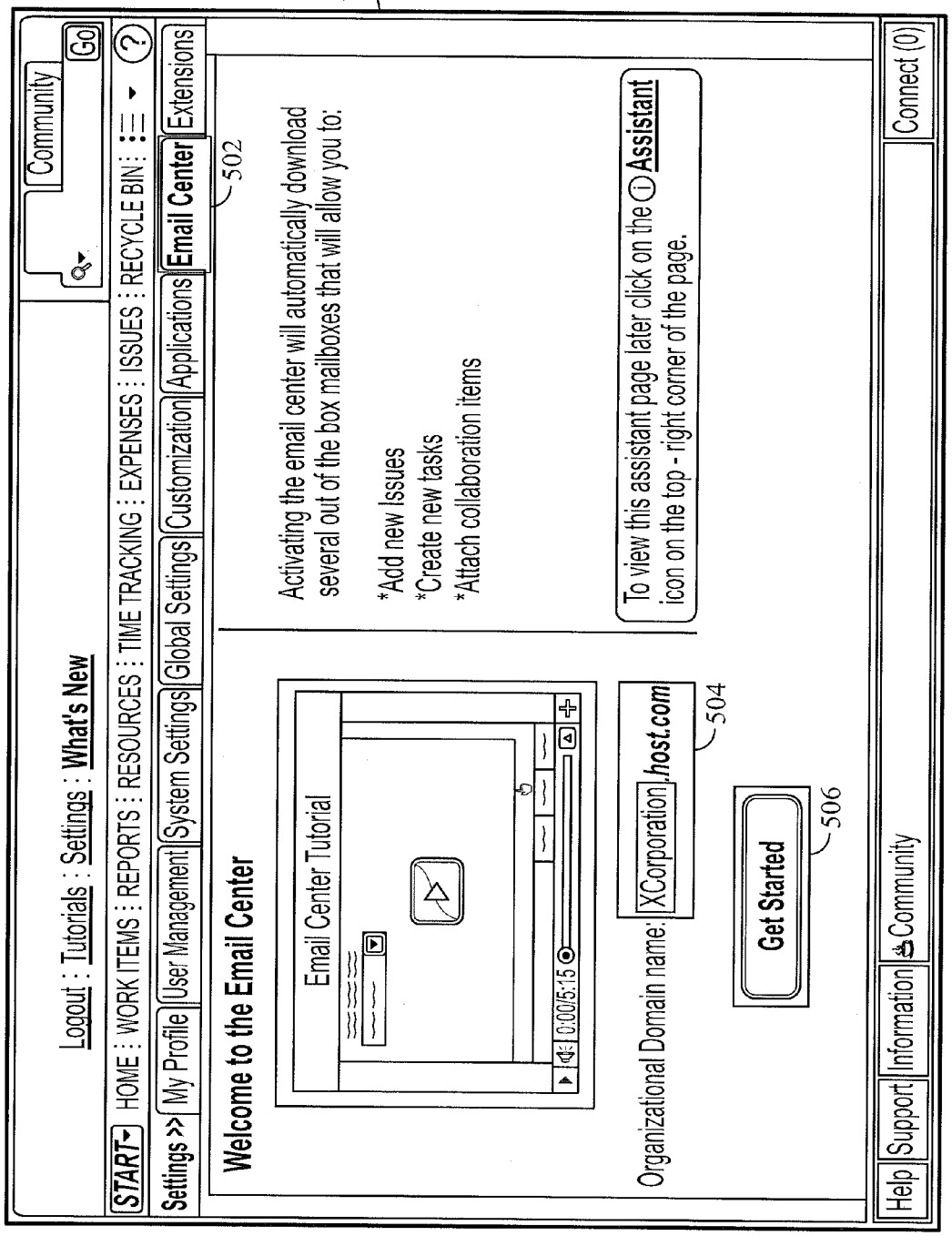
FIG. 5A illustrates an interface to create a mailbox domain for an e-mail-based messaging system according to an embodiment of the invention.
Figure 5B:
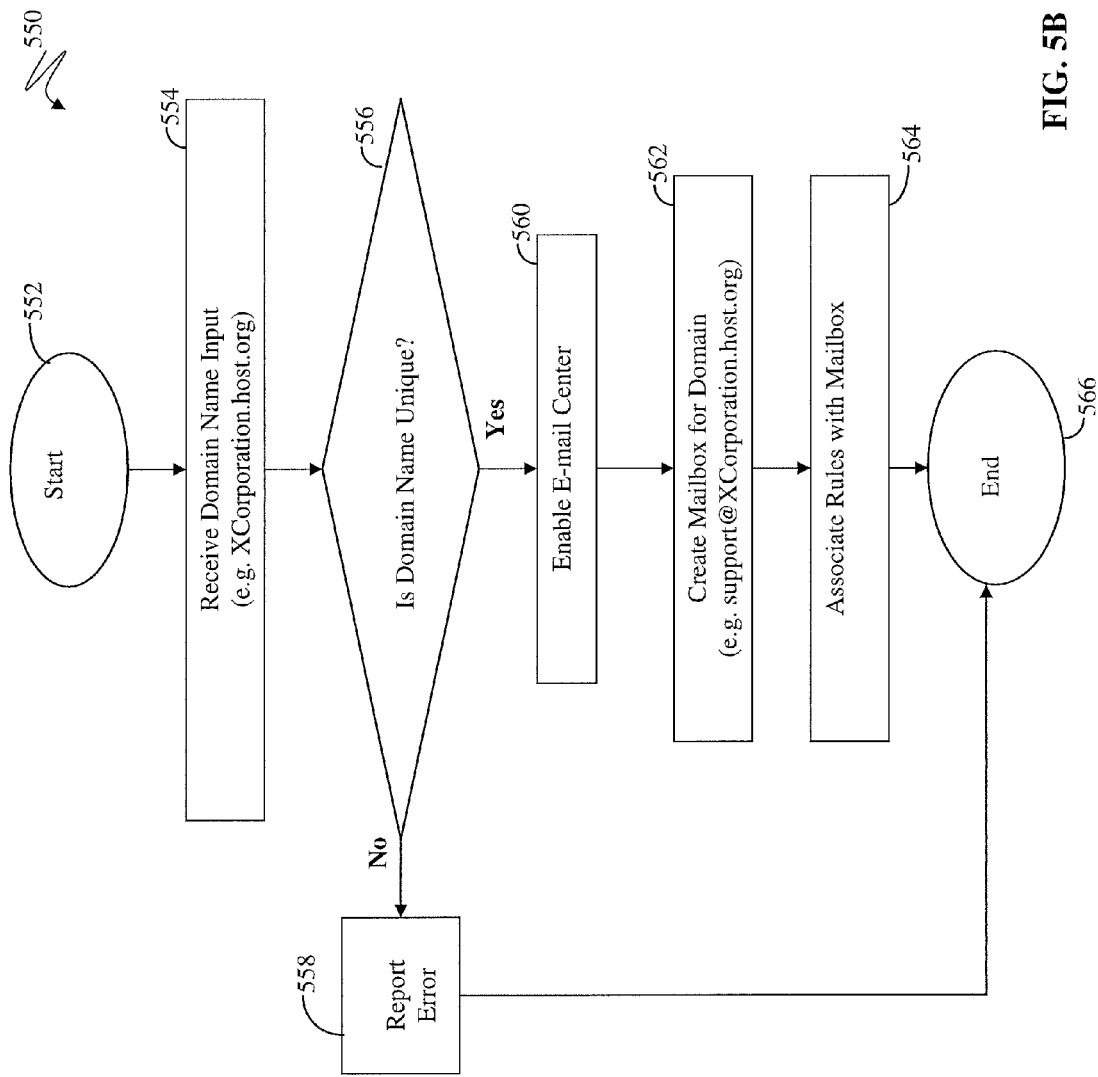
FIG. 5B illustrates a process for activation of a domain for an e-mail-based messaging system, according to an embodiment of the invention.

Reference is now made to FIGS. 5A-5B, which illustrate an activation of a message center, such as e-mail center 106. In such an example, a company, e.g. XCorporation, may wish that its licensed users of project management application 102 and also its customers have the ability to modify and add objects into project management database 104 directly from messaging such as e-mail. A user from XCorporation of project management application 102, such as a system administrator (or other individual with e-mail center activating permission) may attempt to activate e-mail center 106 through an interface to accomplish this function.

Reference is now made to FIG. 5A, which shows an interface having window 500 that the system administrator may access through tab 500 (e-mail center tab). In one example, e-mail center tab 502 may be available only to a user with permission, such as the system administrator.

Within window 500, the administrator may input an organization domain, which in one embodiment should be globally unique, e.g. "XCorporation" for "XCorporation.host.com" as shown in input box 504. The administrator may push (e.g., via a mouse or other pointing device) button 506, e.g. "Get Started," to activate e-mail center 106.

Upon pushing button 506, activation unit 202 (see FIG. 2A) may receive the input of the organization domain name and may begin a process to activate e-mail center 106. Reference is now made to FIG. 5B, which illustrates process 550 for activation. Process 550 may be performed by processor 132, for example, executing activation unit 202.

In operation 552, the process starts and at operation 554 process 550 may receive the domain name input by the administrator, such as XCorporation.host.com. In operation 556, process 550 may verify that the input organization domain name is unique. To perform this check process 550 may access a list of domain names. Project management database 104 may store a global domain registry and mark domain names as being globally unique. When there is an attempt to create or update domain name, a uniqueness check may be performed against that registry and an alert or message may be provided to the user appropriately or, if there is no collision, updating the organization domain name may be allowed. If in operation 556, the domain name is not unique, process 550 may report the error to the administrator in operation 558 and terminate process 550 in operation 566, waiting for the administrator to input a new domain name to test for uniqueness (which will again trigger the process). If in operation 556, process 550 verifies that the domain name is unique, process 550 may enable e-mail center 106 in operation 560.

Enabling e-mail center 106 in operation 560 may include the steps of verifying the uniqueness of the selected domain name and creating at least one mailbox with at least one active rule. Activation unit 202 may in operation 560, for example, install e-mail center default out of the box mailboxes within the e-mail center, such as a Support mailbox, to enable submission of issues through e-mail, a NewTask mailbox to enable easy submission of tasks, etc Activation unit 202 may also in operation 562 trigger mailbox creation unit 204 (FIG. 2A) to create a mailbox for the domain, such as support@XCorporation.host.com (e.g. a global mailbox) and in operation 564 associate with that mailbox a set of rules (e.g. rule(s) 218, from rules 160 in project management database 104) that may be applied when users of XCorporation (e.g. licensed users and customers) send e-mail massages addressed to the created mailbox When process 550 is activated, a message may be displayed on the administrator's screen, which may describe that new applications are being installed.

In operation process 550 may terminate, with e-mail center 106 activated (and domain 210 created) for XCorporation's employees and customers.

Creating a Mailbox

Figure 6A:
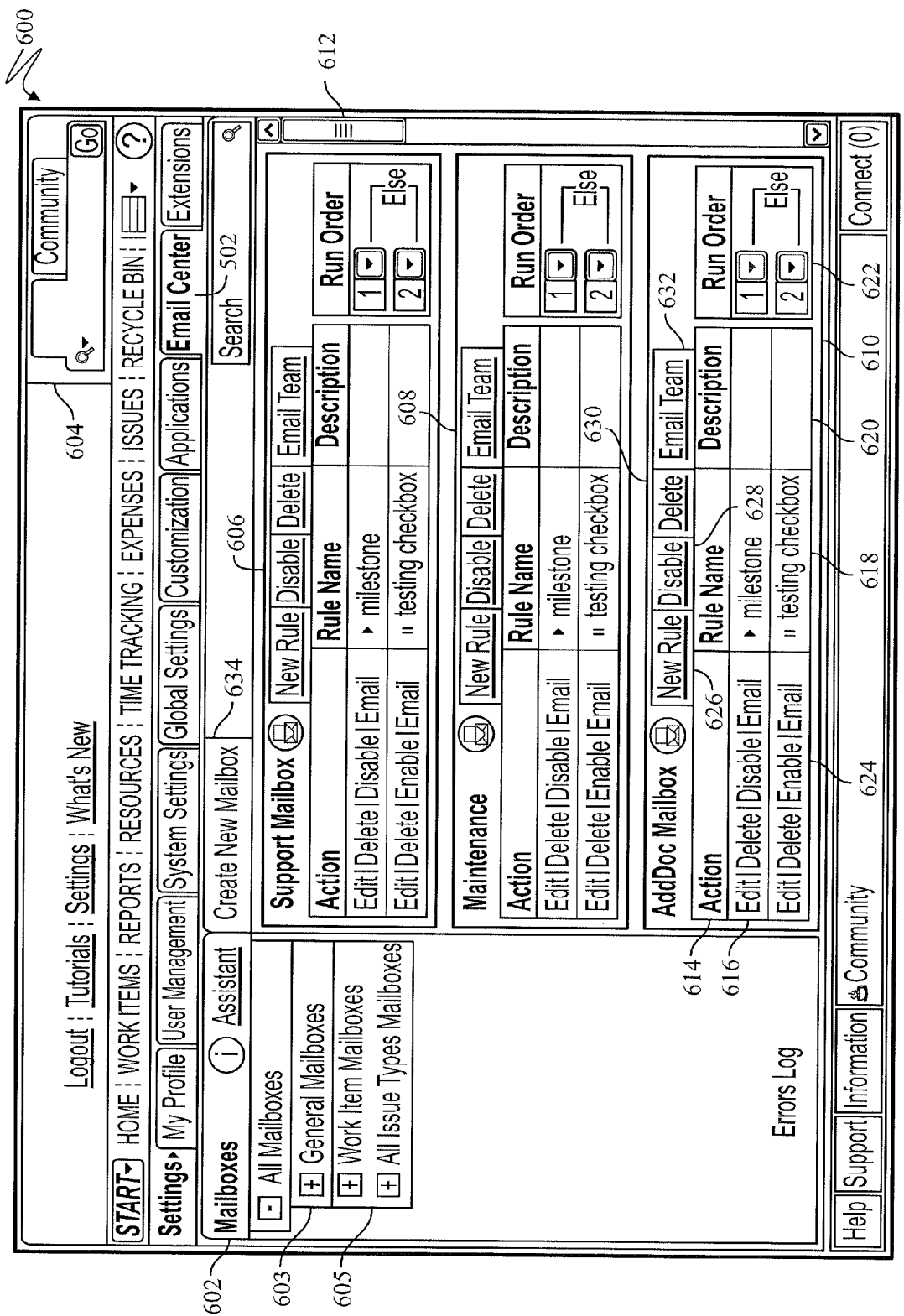
FIG. 6A illustrates an interface for creating a mailbox, according to an embodiment of the invention.
Figure 6B:
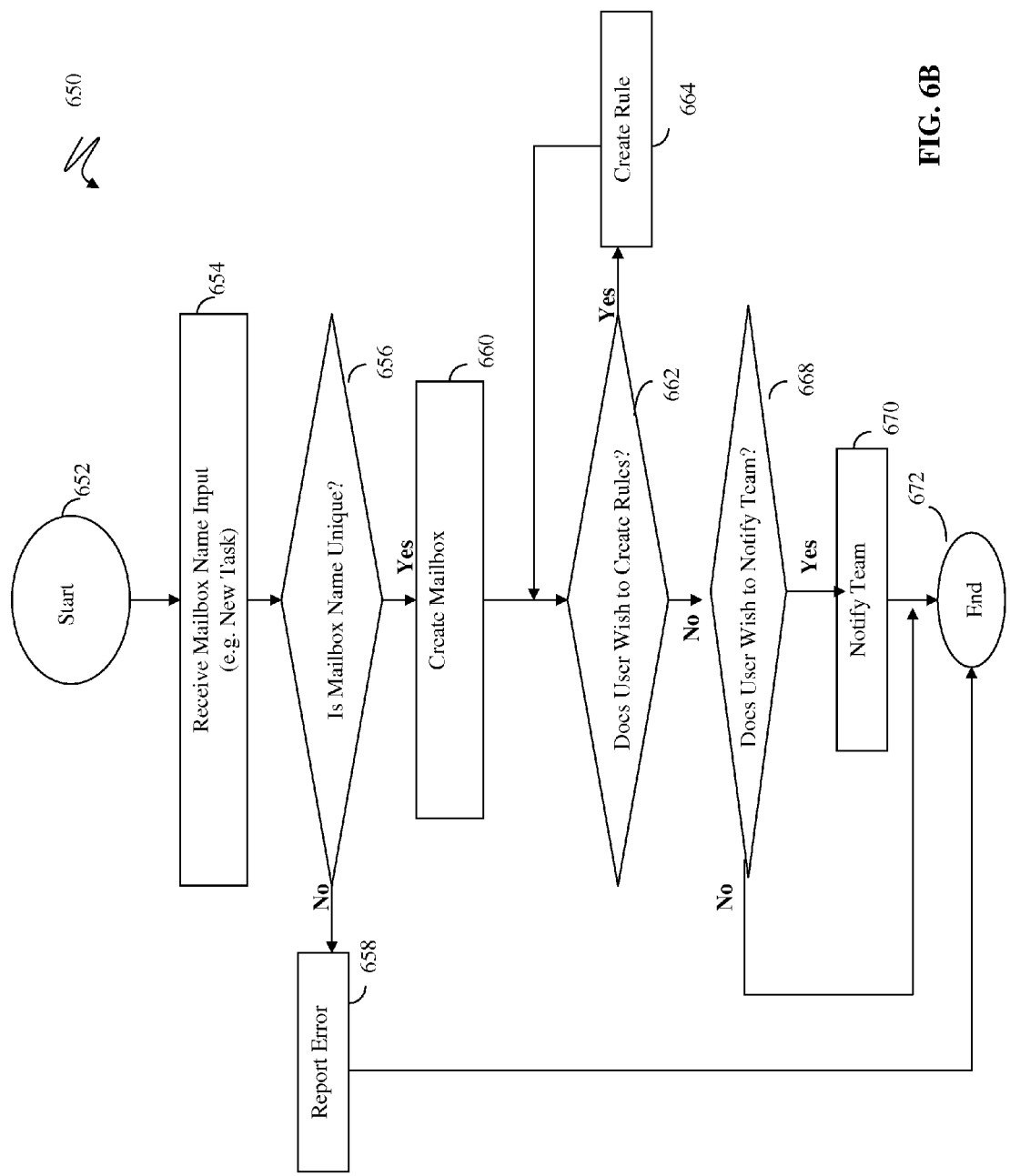
FIG. 6B illustrates a process for creating a mailbox, according to an embodiment of the invention.

Reference is now made to FIGS. 6A-B, which illustrate the creation of a global mailbox, such as NewTasks@XCorporation.host.com, for a domain in a message center, such as e-mail center 106. In such an example, a company, e.g. XCorporation, may wish to allow their licensed users (e.g. the XCorporation employees) to create new tasks for project management database 104, without having to directly access project management application 102. The administrator in this example may wish to create a mailbox for creating new task objects. A user from XCorporation of project management application 102, such as a system administrator (or another individual with mailbox creation permission) may create a new mailbox such as NewTasks@XCorporation.host.com through an interface.

FIG. 6A shows interface 600 the administrator may access, (e.g. through e-mail center tab 502). Window 602 included in interface 600 may be presented showing a number of different types of mailboxes that may be created. An embodiment may include global (or general) mailboxes 603, such as: Support@XCorporation.host.com
Maintenance@XCorporation.host.com, etc., and also object-related or issue-related (per entity type) mailboxes 605 (which may be related to specific objects or issues), such as: Project1@XCorporation.host.com,
Version5.2@XCorporation.host.com, etc.

Interface 600 may show, e.g. as a default, all the mailboxes currently created for a domain. Search box 604 may enable searches through mailbox names, rule names and mailbox descriptions. FIG. 6A shows three mailboxes: support mailbox 606, maintenance mailbox 608 and AddDoc mailbox 610 (each a global mailbox). Additional mailboxes may be viewed, for example by moving scroll bar 612.

Each mailbox may have associated with it one or more of rules. For example, mailbox 610 has two rules associated with it: rules 614 and 616 (mailboxes 606, 608 each also have two rules associated with them). Each rule may include data such as a rule name (as indicated in column 618 for the rules of mailbox 610) and a description (as indicated in column 620 for the rules of mailbox 610). The rules may be user-defined, and may contain variables, which may be also user-defined. Other rule data may be used.

An ordering of the rules (as indicated in column 622 for the rules of mailbox 610) may also be specified. For example, for mailbox 610, rule 614, may be applied first (as indicated by the "1" in column 622), before rule 616 (indicated by the "2" in column 622 and the "else" indication). Actions column 624 (for the rules of mailbox 610) shows a number of actions the administrator may take with regard to each rule, such as editing, deleting, disabling or sending an e-mail message concerning the rule. Buttons 626-632 may allow the administrator to perform functions for the mailbox such as adding a new rule to the mailbox (with button 626), disabling a mailbox—taking it out of use (with button 628), deleting a mailbox—completely erasing it (with button 630) and sending an e-mail message to a "team" (or group) of users associated with the mailbox (with button 632).

The administrator may use button 634 to create a new mailbox. When the administrator clicks on (e.g., using a mouse or other pointing device) button 634, a pop-up window may appear, for example, allowing the administrator to enter a new mailbox name such as New Tasks.

Reference is now made to FIG. 6B, which illustrates process 650 for creating a mailbox, according to an embodiment of the invention. Process 650 may be performed by processor 132, for example, executing mailbox creation unit 204.

In operation 652, the process starts, and in operation 654 process 650 may receive the mailbox name input by the administrator, such as "NewTask". In operation 656, process 650 may verify that the input mailbox name is unique for the domain. To perform this check process 650 may check a table that may be maintained containing a list of mailbox names for the domain. If in operation 656, the mailbox name is not unique for the domain, process 650 may in operation 658 report the error to the administrator and terminate process 650 in operation 672, waiting for the administrator to input a new mailbox name (which may again trigger the process). If in operation 656, process 650 verifies that the mailbox name is unique, process 650 may generate a mailbox (e.g. NewTasks@XCorporation.host.com) in operation 660.

Generating a mailbox in operation 660 may include operations such as creating a record in a mailboxes table. Mailbox generation unit 204 may in operation 660, for example, install elements within the servers.

In operation 662, process 650 may determine if the administrator wishes to create rules that may be associated with the mailbox. When a mailbox is generated, rules (e.g. from the rules database) may be automatically associated with the mailbox and/or the user (e.g. the administrator) may create his or her own rules. In operation 662, it may be determined that the administrator may wish to create a rule. If so, then process 650 proceeds to operation 664, where a rule is created (e.g. following process 400 described with reference to FIG. 4A). Operations 662 and 664 may be repeated while the administrator wishes to create rules. If in operation 662, it is determined the administrator does not wish to create any further rules process 650 may proceed to operations 668-672.

In operation 668, process 650 may determine if the administrator wishes to notify members of the company by e-mail on the creation of the new mailbox. If in operation 668 the administrator does wish to notify members of the company, process 650 may proceed to operation 670 and perform a notification procedure. This notification may create and include an appropriate mailbox vCard or other structure and may include the mailbox expected formats (e.g., per rule) that will be sent to the end user. For example a list of licensed users who may access the mailbox may be maintained by project management application 102 (e.g. all users from XCorporation). Mailbox creation unit 204 may access that list and generate an e-mail message for each person on the list. If the administrator does not wish to notify members of the organization, operation 670 may be omitted. Process 650 may terminate at operation 672.

Setting Rules for a Mailbox

Figure 7A:
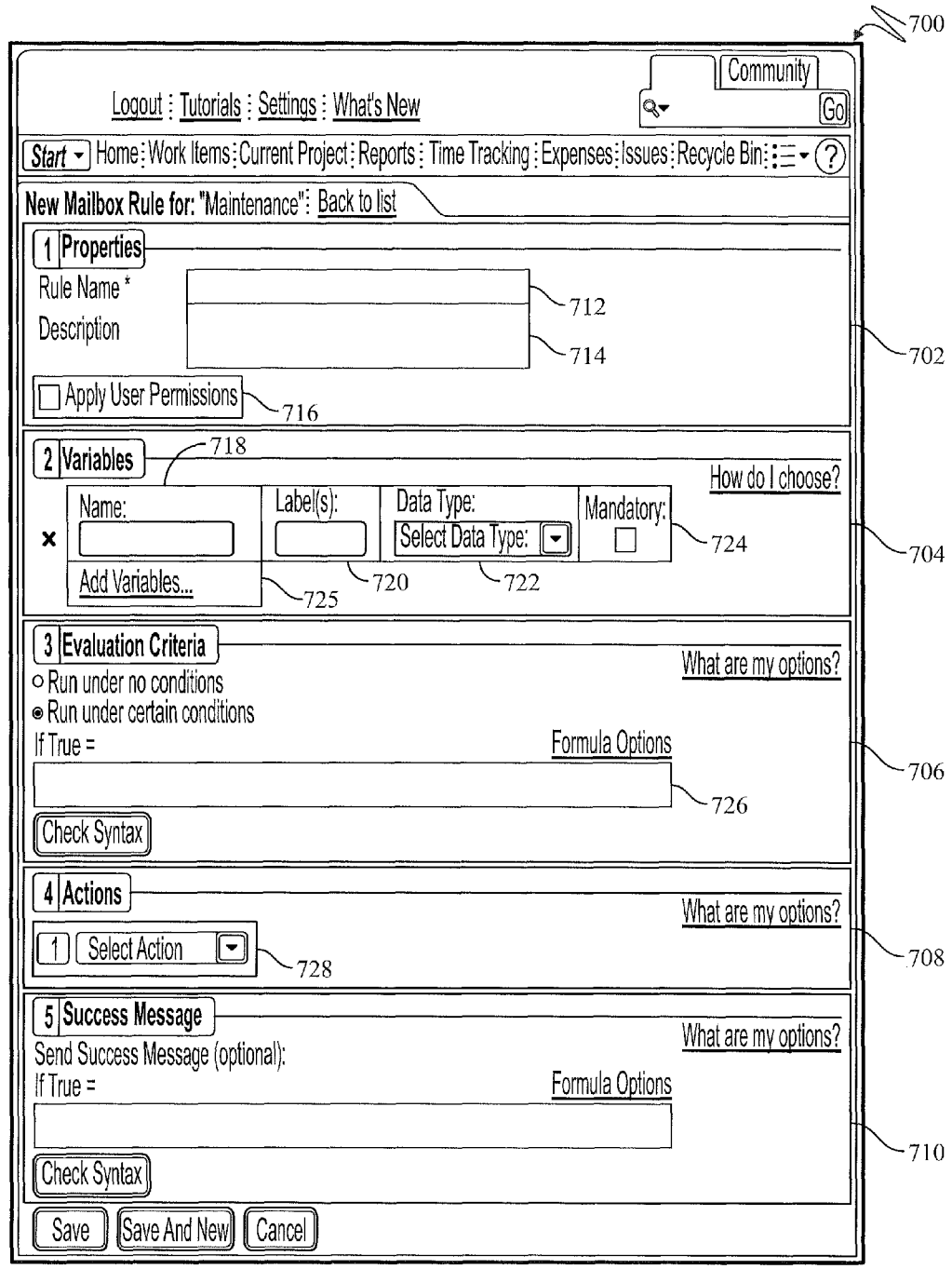

Reference is now made to FIGS. 7A-7B, which illustrate an interface for the creation of a rule for a mailbox. FIG. 7A illustrates interface 700 for making a rule for a global mailbox (e.g. a rule-making wizard). Interface 700 may include rule-making elements (sections) such as: properties section 702, variables section 704 (for custom, user-defined variables), evaluation criteria section 706, actions section 708 and success message section 710.

Properties section 702 may include, for example, rule name field 712 description field 714. Interface 700 may also include an apply user permissions indicator box 716. The administrator may access rule maker unit 206 and interface 700 may be presented. In FIG. 7A, the administrator may check (or select) apply user permissions indicator box 716. Using as an example the rule for creating new task objects in NewTasks@XCorporation.host.com, if user permissions indicator box 716 is checked, only users with the appropriate permission level (e.g. users covered by the license of XCorporation) may be able to create tasks using the NewTasks mailbox. In other examples, if user permissions indicator box 716 is left unchecked, both non permitted and permitted users (e.g. customers of XCorporation) may be allowed to create new tasks with or by sending e-mail messages to the NewTasks@XCorporation.host.com mailbox. This may be done in this manner, since the e-mail center may impersonate the e-mail sender user and there are cases, where the administrator would like certain objects\fields to be modified regardless of whether the user has appropriate permissions or not (e.g.: add task to a maintenance project, even though the user is not a project manager of the project, and typically only project managers can add sub tasks to projects).

Variables section 704 may include variable name field 718, label field 720, data type field 722, and mandatory indicator 724 (which are used to define a custom, user-defined variable). Variables section 704 may all allow a user (such as an administrator) to create, user-defined, custom variables for a rule, such as the ProjectVar and DueDateVar variables 330, 331 described with reference to FIG. 3B. Variables section 704 may provide an interface for variable definition by user-input into a rule to trigger an action within project management database 104, wherein the variable is identified by a label and the label is provided to signal a location of data for the variable in an electronic message.

In variable section 704 of interface 700, fields 718, 720 and 722 may be provided for specifying data for the custom variables. For example, variable name field 718 may allow the administrator to declare a custom variable and give it a name to be used within the rule. Label field 720 may allow the administrator to associate the variable with one or more labels that may be used within a message such as within the body text of an e-mail message to identify the data in the e-mail message for the variable. Data type field 722 may allow the administrator to specify what type of data the custom variable will hold (e.g. numeric, currency, date, text). Mandatory indicator 724 may allow the administrator to specify whether or not the custom variable data must necessarily be found in an e-mail message before the actions of the rule can trigger.

To create a custom variable, the administrator may provide input into fields 718, 720 and 722. The administrator, for example may input a name for a custom variable, such as ProjectVar into name field 718. The administrator may also input in label field 720 a list of possible labels "Project", "Project" . . . for example in different languages), to identify the project variable data in in-coming e-mails. A project label may be in one of a number of different languages (such as English, Russian, Hebrew, etc.) so that the writer of the e-mail can use his or her native language to create a project label. Any number of different ways to specify a project can be used and incorporated into the label.

Using interface 700 an administrator may also specify a data type for a variable in data type field 722. In one example, the administrator may push on a button (e.g. using a mouse or other pointing device) for data types in field 722 and a window may reveal a number of possible data types such as:

| Type | Description |
| --- | --- |
| Numeric | A field that represents a number (e.g. an integer or decimal number (double float precision number)) |
| Text | A field that represents text (e.g. up to 255 characters) |
| Text Area | A field that represents text (e.g. up to 2000 characters) |
| URL | A field that represents a link to a specific Universal Resource Location (URL). Clicking on the URL field may navigate a browser to the URL specified. |
| Date | A field that represents a date value (such as 1-31-11 for January 31, 2011, etc.) |
| Checkbox | A field that represents a selection of either true (checked) or false (unchecked). (Checkbox may operate like a Boolean variable.) |
| Percent | A field that represents a percentage (e.g. 100%, 25.35%), either as an integer or decimal (e.g. double) number |
| Currency | A field that represents an amount in a base currency, Dollars, Yen, Euros, etc. |
| Duration | A field that represents a duration value, such as 4 hours, three days, 10 weeks, etc. |
| Object | A field that represents an object of the project management system, such as a project, milestone, task, etc. |
| Pick List | A field that represents a list of values, where one value may be selected, such as a list of colors red, green, blue, where blue is selected. |

For a variable such as ProjectVar (which requires a project name), the administrator may select "Object" as the data type. For some data types such as object, further selection categories may be presented when the data type is selected. For example, when object is selected a second window corresponding to the choice of "object" may be provided, and the administrator may then choose between object types such as:

| Object Type | |
| --- | --- |
| Work item | Project |
| | Milestone |
| | Task |
| Resource Entity | User |
| | Job Title |
| | Group |
| Customer | |
| Expense Sheet | |
| Issue Type | Bug |
| | Risk |
| | Issue |
| | Request |

Using the example of the variable "ProjectVar" the administrator may select from the Work Item group "Project." Thus when the variable ProjectVar used, it will require an identifier for a recognized "Project" object within project management database 104.

An administrator may also check or leave unchecked checkbox 724 of interface 700 to indicate whether or not the custom variable is mandatory. When mandatory indicator 724 is checked, data for the variable "ProjectVar" may be required for all e-mails sent to a mailbox applying this rule. When the mandatory indicator box (e.g. box 724) is not checked, the variable in question may then be included in the e-mail optionally.

Using the interface shown in FIG. 7A, the system administrator may add additional variables, for example by clicking Add Variable button 725.

Evaluation criteria section 706 (appearing below variable section 704) may allow the administrator to input conditions what will allow the rule to trigger or fire only after the satisfaction of certain conditions. One condition may be that the data parameters required for performing an action (such as the data needed for generating a new task object etc. in project management database 104) may be required to be satisfied by the information provided by the in-coming message.

Evaluation criteria section 706 may also include condition field 726, which the administrator may use to input specific conditions such as whether or not a project is in a specific state, such as Active, or whether progress has been updated on a work item or issue in recent days. If the condition placed in the condition field is true, the condition may trigger actions that may be specified also in the rule. Conditions of condition field 726 may include variables from the variable section 704. For example, conditions may include that a given project (e.g., which was fed by the sender as a parameter) is active or draft. If a project is completed, this may be a signal to not execute the operation.

Actions section 708 may list the action(s) 728 that may be triggered in project management application 102 upon the occurrence of the conditions (such as the finding of sufficient data in an e-mail message to perform an action). Such actions may include, for example, creating a new object in project management database 104, rescheduling a date (or time) of a task, sending an e-mail related to a project object, sending a request for an update, updating a field in a report or linking documents attached to an the e-mail to a project element.

Success message section 710 may provide text for responses to e-mail messages processed according to the rules of the mailbox. For example, if an e-mail message is sent to NewTasks@XCorporation.host.com and processed successfully (according to one of the rules of the mailbox), the e-mail sender may receive a success message. If an e-mail is sent to NewTasks@XCorporation.host.com and the e-mail cannot be processed successfully, the e-mail sender may receive a non-success message.

In the actions section 708, it may be provided that an administrator may push a button (e.g. using a mouse or other pointing device), such as button 728 in choosing or selecting actions for a rule. In one example, when an administrator clicks on button 728 "Select Action" in section 708. Popup menu may be generated, which may show actions such as:

| Action | Description |
| --- | --- |
| New Object | Enables a user to define a new object creating action |
| Outbound Call | Enables a user to call an external Web service that may either interact with project management application 102 or another system |
| Reschedule | Enables rescheduling of a date concerning an object of project management application 102 (e.g. a start date, end date or due date) |
| Save Attachments | Enables a user to save attachments as a collaboration item, concerning a project element |
| Send E-mail | Enables a user to define an e-mail template and a distribution list for the e-mail template |

-continued

| Action | Description |
| --- | --- |
| | (the e-mail template may also include a hyperlink to an object) |
| Send Update Request | Enables a user to send an update request the team members that are associated with a task |
| Update Field | Enables a user to edit the fields (such as the fields defined for an entity of the project management application. |
| Save Triggering E-mail | Enables a user to determine what to do with the original e-mail. Whether to save it as an e-mail object in the system and linked to which object. |
| Change State | Enables a user to update state of work items, expense sheets and timesheet. |

In the example creating an actions such as "Make New Task" as shown in action 329 of FIG. 3B, functions such as creating a new task having a title from the subject line of the e-mail message, creating a note related to the new task from the e-mail body and 3) uploading any attachments linked to the e-mail message as documents into the task may be accomplished by selecting the "New Object" option.

Reference is now made to FIG. 7B, which illustrates interface 730 for specifying actions for the Make New Task action. Interface 730 may provide sections 732-744 for inputting the data that may be required for creating the new task in project management database 104. For example, in section 732 "E-mail.subject" (the subject line of the e-mail) may be input to provide a name for the new task. In section 734 "E-mail.sender" (the sender of the e-mail) may be input to identify the task creator. In section 736 the custom, user-defined variable "ProjectVar" may be input to identify the new task with an associated (parent) project. In section 738 "E-mail.CC" may be input to identify resources for the new task (e.g. employees and other who may be responsible for completing the task). In section 740, the custom, user-defined variable "DueDateVar" may be used to set a due date for completion of the new task. In section 742 "E-mail.Body" may be input to create a note for the new task. In section 744 "E-mail.Attachments" may be input to link attachments from an e-mail message as supporting documents for the new task.

The administrator may save the rule, once completed. The administrator also may give an order number to the rule, for example, giving the new rule in for the New Tasks mailbox an order, such as of 1 (or the first position) putting the rule that was previously first down to the order of 2. (See also "Run order" indicators 622 in FIG. 6A).

Rule Per Entity Type

Rules may be created to generate work item objects (e.g. task objects). Using the mailboxes and rules it may also be possible that a mailbox can be create that will allow users to add items to each type of work item in the system. For example for all of its project-type objects in project management database 104 a company, such as XCorporation, may wish to allow its users to create new discussion objects using e-mail.

Figure 8A:
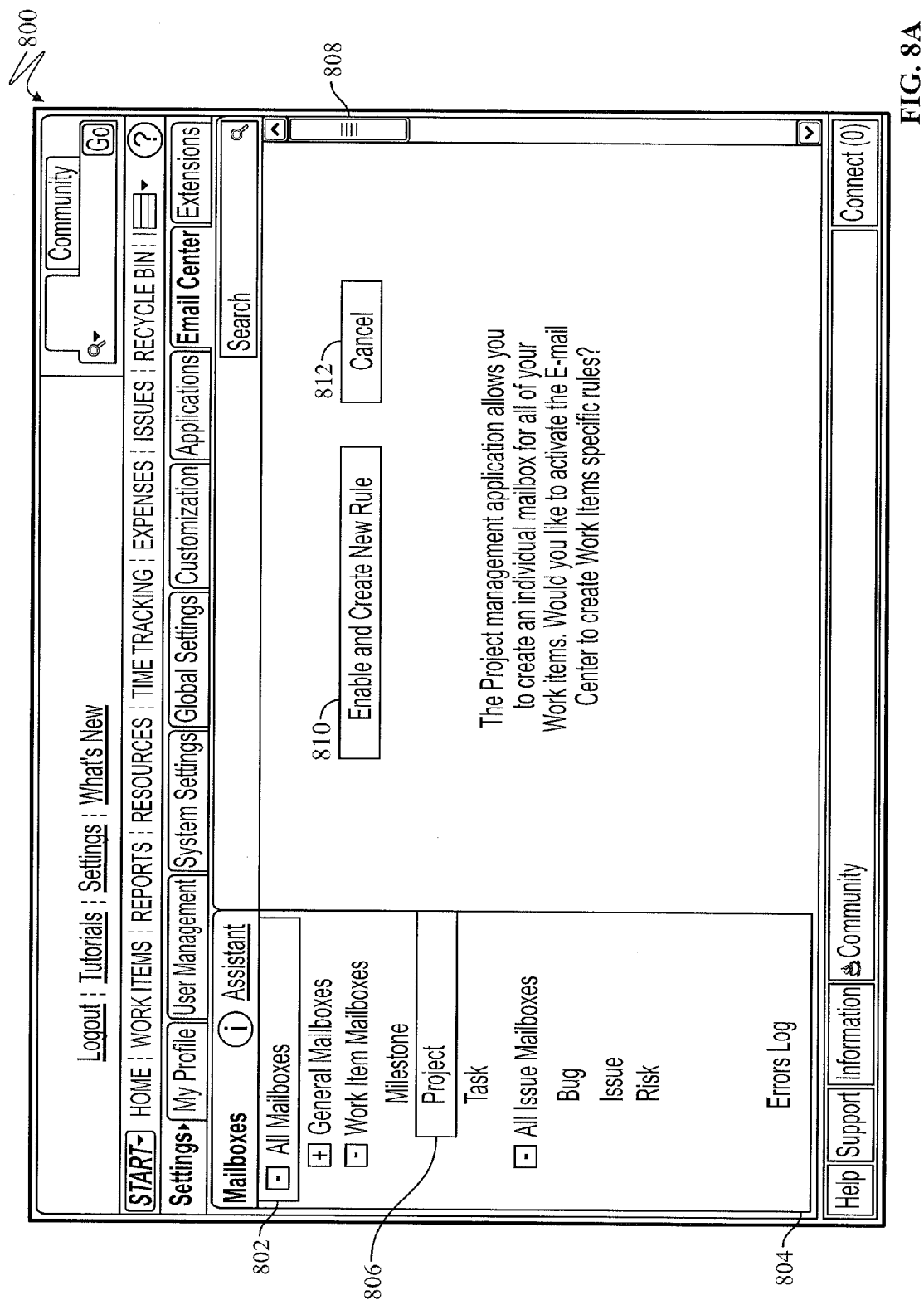
FIG. 8A illustrates an interface for adding a rule to entity mailboxes, according to an embodiment of the invention.

A user of project management application 102, such as an XCorporation system administrator (or other individual with per entity rule making capability) may add an entity-type rule to accomplish this function. Reference is made to FIG. 8A, which illustrates interface 800 for adding a rule to one or more entity mailboxes (such as all project mailboxes). A user such as an administrator may access interface 800 and select "All Mailboxes" 802 option in window 804 In FIG. the administrator may they push projects button 806 (e.g. using a mouse or other pointing device). Pushing projects button 806 may generate window 808, which may allow the administrator to create a rule that will automatically apply to all mailboxes for a certain type of object (such as for all project objects, or all milestones or all task objects, etc.). With this by entity-type rule (as applied, for example, to all projects), any time a mailbox is created for a project, e.g. SeptemberProject@XCorporation.host.com, a per entity rule may be included in the rules for that project mailbox. One non-limiting advantage of using object specific mailboxes is the ease of use it may give the end user when wanting to interact\perform sets of actions with a given object (for example: key project). Instead of needing to supply the object as a parameter every time a person sends an e-mail message, that object may simply has an e-mail address and the person interacts with that object through its e-mail.

The administrator may be presented with options, such as an "Enable and Create New Rule" 810 and "Cancel" 812. If the administrator chooses "Enable and Create New Rule" 810, he or she may be presented with an interface (e.g. similar to FIGS. 7A-B) which may allow the administrator to specify a rule that will apply to all project mailboxes. The administrator may create a rule such that, when an e-mail message is sent to a mailbox for a project, e-mail center 106 may create a discussion object in project management database 104 based on the body of the e-mail message.

Figure 8B:
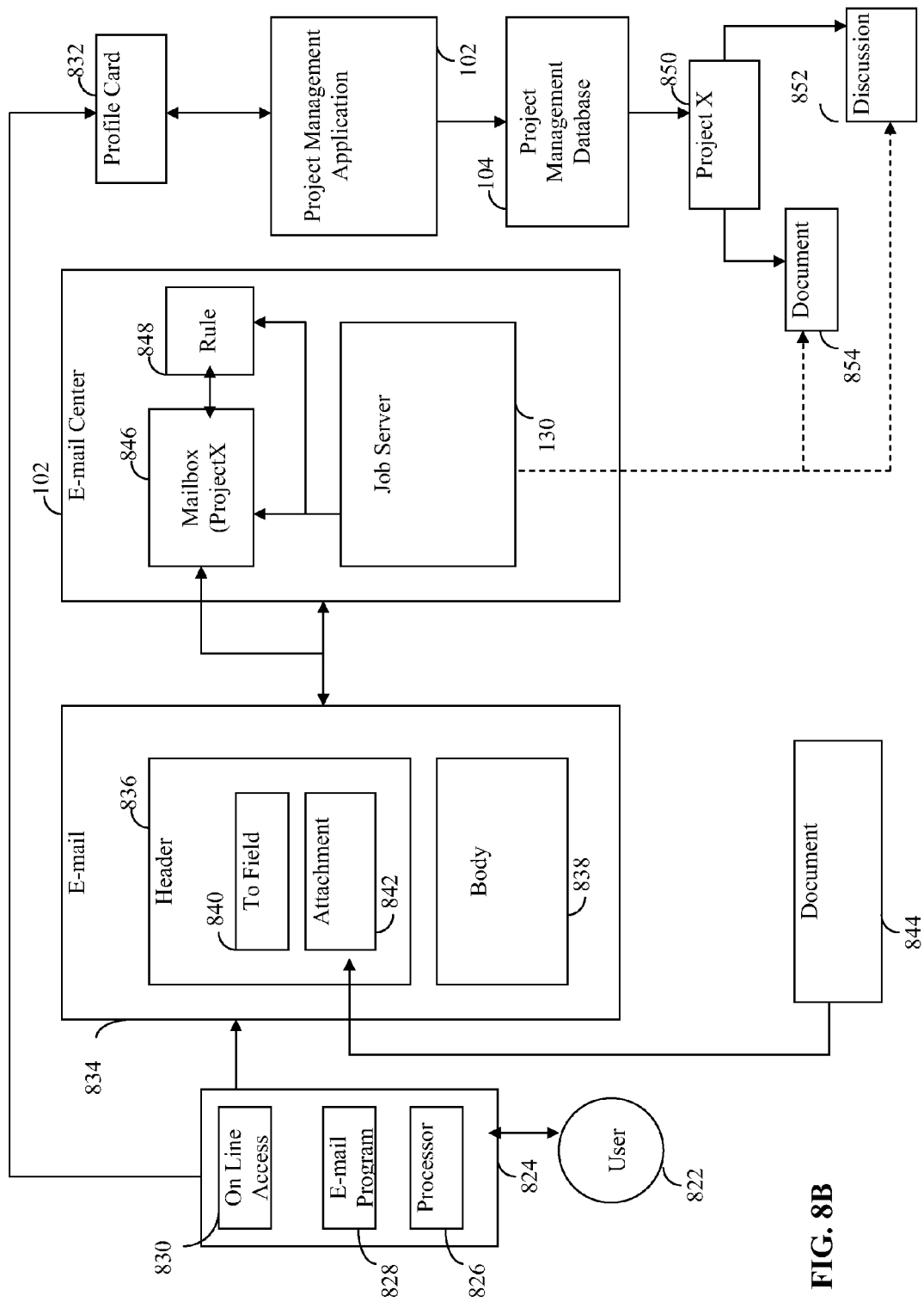
FIG. 8B illustrates a rule applicable to entity mailboxes, according to an embodiment of the invention.

Reference is now made to FIG. 8B, which illustrates an application of the rule now applicable to project mailboxes. User 822, for example an employee of XCorporation (operating under license from XCorporation), may have a question about or may wish to begin a discussion about Project X. User 822 may operate computer 824, which may be either a mobile computer device or a personal computer device, having processor 826 and operating e-mail program 828. In addition, computer 824 may include on-line access software 830 that may allow user 822 to access project management application 102 through Internet 112.

To ask the question or otherwise start the discussion, user 822 may need to determine the correct e-mail address for Project X. Project management application 102 may include public project profile card 832 (e.g. available from the server 122 where project management application 102 may be located). User 822 may access project management application 102 and view public project profile card 832, e.g. using on-line access software 830. User 822 may see the mailbox for ProjectX is projectx@XCorporation.host.com.

User 822 may (e.g. later that day) prepare e-mail 834 to send to projectx@XCorporation.host.com. E-mail message 822 may include header 836 and body 838. Header 836 may include data fields such as From Field, CC Field, Subject Field, and Date Field. To Field 840 and Attachment Field 842 may also be included in header 836. Attachment Field 844 may contain links or references to files (e.g. documents or images) which may be sent with the e-mail to its destination.

User 822 may input, into To Field 840, the address projectx@XCorporation.host.com. User 822 may attach document 844 (e.g. a text file or image), which he or she feels relevant to the discussion via a link to Attachment Field 842. User 822 may send e-mail message 834 to e-mail center 106 for project mailbox 846. Project mailbox 846 may have associated with it project rule 848, such as the per-entity rule created by the administrator as discussed above with reference to FIG. 8A.

Job server 130 (e.g. using parser 156 and business rules engine 158) may access e-mail message 834 and parse the data contained in e-mail message 834 according to rule 848. E-mail message 834 may satisfy the conditions (data requirements) of rule 848 and trigger actions to create a discussion for project X. For example, for projectX object 850 of project management database 104, execution engine 232 may create discussion element 852, which may be associated with projectX object 850. In addition document 854 may be an upload of document 844, and document 854 may also be associated with discussion 852 and projectX object 850.

Global Mailboxes for Maintenance and Support

An embodiment of the present invention may permit users to create a mailbox of issues or cases with organization-wide applicability, such as (a mailbox for maintenance or support issues). For example, XCorporation may wish to manage maintenance throughout the organization and allow all of XCorporation's employees and clients to open issues or cases for the IT department through a mailbox, such as maintenance@XCorporation.host.com. In another example, XCorporation may wish to allow users to create case or incident reports by sending e-mail to a mailbox, such as support@XCorporation.host.com. Such a mailbox may be created automatically, once an E-mail Server is activated. Unlike other mailboxes, which may include a check for the sender's license, this special mailbox may allow non-licensed as well as non recognized senders to send e-mail messages to such mailbox (e.g., to support the use case of customers of customers sending incidents). An administrator may then be able to perform limited modification to such rules, such as updating what are the expected parameters (or none) as well as the fields that should be modified.

The action to be taken when an e-mail message is sent may be the creation of a new issue object within project management database 104. In creating an action for this rule, the administrator (using an interface such as that shown in FIG. 7B) may establish parameters such that:

The Subject Field of the e-mail may be used as the name (or title) of the issue—as indicated by the code "E-mail.subject" input into an "Issue Name" area;

The e-mail address of the sender (indicated by the code "E-mail.sender") may be used for a field "Reported By" (N.B. a field such as "Issue's Related Customer" may also be maintained and the name of the e-mail sender "E-mail.sender" may also be used for the related customer field, when a check is made to confirm that the sender is part of a customer organization, e.g. by checking the sender's e-mail address against a list of related customers);

A default e-mail address may be provided for an "Assignment To" field such as IssueAssignment@XCorporation.host.com (N.B. the default address may also be one for a specific person who may initially be assigned all incoming support issues);

The e-mail body text (indicated by the code "E-mail.body") may be used for a "Description" field; and The e-mail attachments may be used as related documentation concerning the incident—as indicated by the code "E-mail.Attachment" input into "Attachments" area 1112.

Other or different fields may be used, and information may be in different locations in a message. The administrator may wish to add a field for an element relevant to maintenance, such as "Browser" (for the type of Internet browser program the e-mail message sender may be using).

To get information on the browser from an e-mail sender, the administrator may also define a variable, such as "BrowserVar." Defining a variable such as "ProjectVar," and "DueDateVar" were described above with respect to FIGS. 3B and 7A-B. BrowserVar may be defined similarly (e.g. where the data on the browser is identified in the e-mail body by a label). And for example, by requiring that BrowserVar be "mandatory" in the e-mails to be received at support@XCorporation.host.com, may require in the body of the e-mail that a browser, identified by a label such as in "Browser: Safari Version 6.0" may be required to be specified in the e-mail. However, in this example, the BrowserVar may be designated as non-mandatory. Other methods of obtaining browser information may be used.

The administrator may publish the e-mail address support@XCorporation.host.com, for example, on the XCorporation Website, or, alternatively, he or she may create an auto-forward rule for the organization's existing support address (such that when e-mail messages are sent to an address such as at help@XCorporation.host.com the e-mail messages may be automatically forwarded to support@XCorporation.host.com.

A user, such as a customer of XCorporation may be experiencing problems with a component of a software system XCorporation installed. The user may now send an e-mail message to support@XCorporation.host.com.

The user may input, into an e-mail message To Field, the e-mail address support@XCorporation.host.com. The e-mail message From Field (the sender field) may contain the e-mail address of the sender: e.g. UserX@customer.com. In an e-mail message Subject Field, the user 1162 may type "Problem with New Software Component." In the e-mail message body, the user may type in or enter description of the computer software problem. The user may identify the browser involved by specifying a label "Browser:" and then provide the browser name, e.g. "Explorer". The user may also attach to the e-mail message a document concerning the problem (e.g. a screenshot showing a generated computer error).

At the message center (e.g. e-mail center 106) the e-mail message may be processed according to the rules of the support@XCorporation.hostcom mailbox. Execution engine 232 may create a new issue called "Problem with New Software Component" in project management database 104 that may be associated with a project object called "Support". The new issue may include in its fields:

Issue Title: (from the e-mail message Subject Field)— "Problem with New Software Component";

Issue Description: (from the e-mail message body text); and

Issue supporting Documentation: (uploaded from the document attached to the e-mail message);

Diagnostic Information: which may be used to diagnose the problem, e.g. the identification of a browser (specified from BrowserVar variable information); and A designated person to handle the assignment 1197, such as an employee at IssueAssignment@XCorporation.hostcom.

Import Contacts

An embodiment of the present invention may also provide for a user of project management application 102 (using e-mail center 106) to input into the contact file of his or her e-mail application all of the e-mail addresses for the mailboxes that have been created for relevant projects, tasks, issues, etc. by e-mail center 106. By importing the e-mail addresses for the mailboxes created by e-mail center, the user may easily have at his or her disposal all of the e-mail addresses and expected formats that will allow the user to perform project management actions using e-mail.

In such an example, a company, such as XCorporation may have activated e-mail center 106. XCorporation may have also activated the creation of mailboxes, for example, for projects. A user may wish to import as contacts to her e-mail program all of the e-mail addresses that have been created by e-mail center 106 relative to the projects being managed by project management application 102.

In one example, the user (who may be registered with project management application 102) may have a profile card, which includes a button for requesting vCards from e-mail center 106. A vCard may be a file having a vCard format, which may be used to store business card information. Files having the extension .vcf and .vcard may for example contain electronic business card information as defined, for example in RFC's 2425 and 2426, and .vcf and .vcard files may be included as vCard files. Permission information (e.g. whether the user is an admin, or super user, or is allowed access to financial data etc.) and other information, such as whether the user is an employee of a client of the project manager application, may be included in the profile card and may be used to determine which e-mail mailbox addresses the user may receive in the request.

Figure 9A:
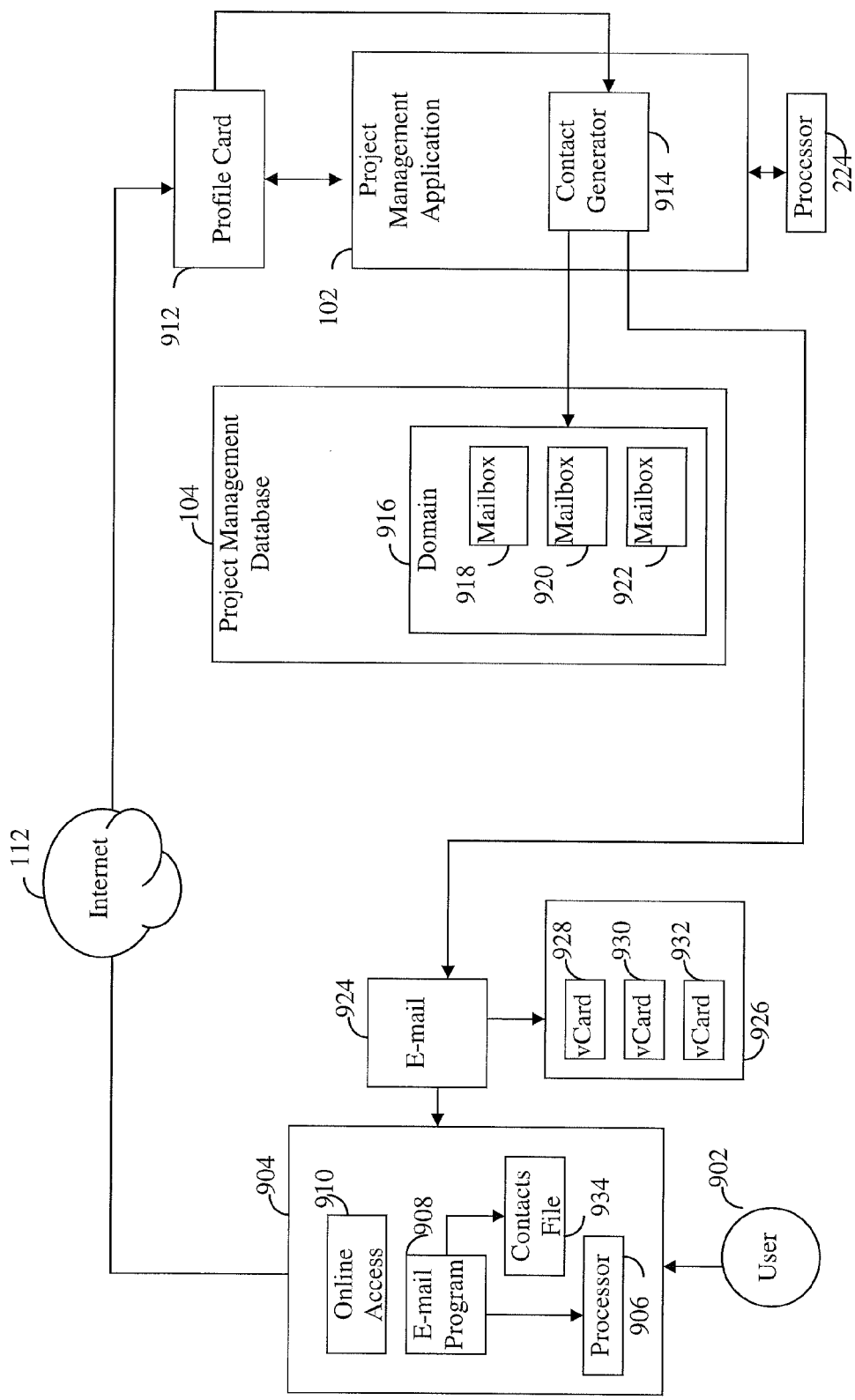
FIG. 9A illustrates system elements for requesting address contacts, according to an embodiment of the invention.

Reference is now made to FIG. 9A, which illustrates elements for requesting e-mail address contacts according to an embodiment of the invention. In FIG. 9A, user 902 may wish to import e-mail addresses for the mailboxes created which may be available to the user, to allow the user to easily operate (and execute actions) in project management application 102 using e-mail messages.

User 902 may operate computer 904, which may be either a mobile computer device (smartphone, laptop, tablet computer etc.) or a personal computer device, such as a PC. Computer 904 may include processor 906, which may operate e-mail program 908 (e.g. a program such as Microsoft Outlook or other e-mail message program) and, in addition, on-line access software 910 that may allow user 903 to access project management application 102 via Internet 112.

To request vCard information in this example, user 902 may access profile card 912, which may be available on-line from project management application 102. Profile card 912 may provide an interface for requesting vCard information. User 902, may for example push a button on profile card 912 (e.g. using a mouse or other pointing device). A request for vCard information may trigger execution of contact generator unit 914, which may be included in project management application 102.

Based on the user profile information, contract generator unit 914 may determine the domain(s) that user 902 may have access to (e.g. domain 916) and within the domain(s), those mailboxes (e.g. mailboxes 918, 920, 922) that user 902 may have permission to access. For all those e-mail addresses within domain(s) 916 user 902 may be permitted to access, contact generator unit 914 may allow user to further select only those e-mail addresses, that he or she would like vCards for.

From a generated list of e-mail mailbox addresses that are available to user 902 (and also desired by user 902) contact generator unit 914 may generate e-mail message 924, addressed to user 902 and attach to that e-mail message, vCard files 926 (e.g. in vCard format) which include in each file the e-mail address and other relevant information (in vCard format) of a mailbox from domain 916. For example, in FIG. 9A vCard files 926, may include vCard files 928, 930, 932 having addresses corresponding to mailboxes 918, 920, 922 as well as the formats defined for the mailbox rules.

E-mail 924 may be sent to computer 904 and may be received by user 902's e-mail program 908. User 902 may open e-mail 924 and then save each vCard file to contacts file 934, which may be associated with e-mail program 908.

Figure 9B:
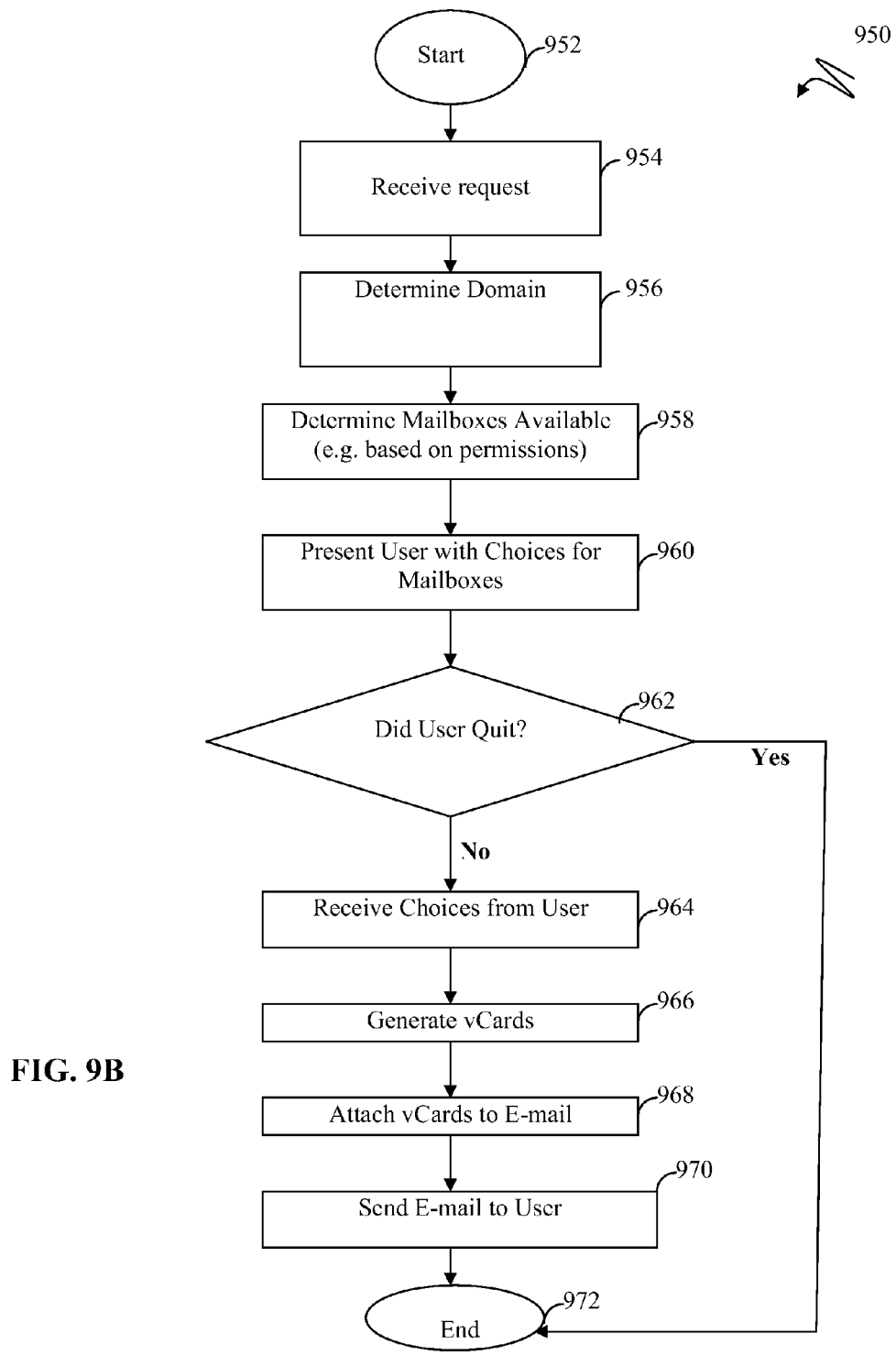
FIG. 9B illustrates a process for generating mailbox address information for importing by a user, according to an embodiment of the invention.

Reference is now made to FIG. 9B, which illustrates process 950 for generating vCard information for importing by a user, according to an embodiment of the present invention.

Process 950 may be executed by processor 132, for example, executing contract generator unit 914. In operation 952, process 950 begins and in operation 954 process 950 may receive a request for vCard information from a user. In operation 956, process 950 may determine (e.g. based on user profile information) what domain(s) the user may have access to. In operation 958, process 950 may determine based on user profile information which mailboxes of the available domains the user will have permission to get by vCard.

In operation 960 the user may be presented with options for selecting mailboxes. If in operation 960, the user chooses to not receive information, he or she may cancel the operation, and in such an event of cancellation, process 950 may terminate in operation 972. If in operation 962, the user does not cancel, process 950 may receive in operation 964 the users mailbox selections (in default process 950 may provide all mailboxes that the user has permission to access).

In operation 966, process 950 may generate vCard files for each of the mailboxes, user has selected (or is permitted to access). In operation 968, process 950 may attach the generated vCards to an e-mail message addressed to the user. In operation 970, process 950 may send the e-mail message to the computer of the user. In operation 972, process 950 may terminate.

Pack Mailboxes into Applications

An embodiment according to the present invention may also allow a user to assemble a mailbox and its associated rules into an application file (application) that may be distributed to others. For example, an administrator of XCorporation may have created a mailbox, such as NewCustomers@XCorporation.host.com, which may be used, for example by sales representatives at XCorporation to create records for their customers by e-mail. Each e-mail sent to NewCustomers@XCorporation.host.com, for example, may either create or update a customer object in project management database 104.

In this example, an administrator of another organization ZCo (which also has a domain at e-mail center 106 and which also uses project management application 102) has heard of XCorporation's NewCustomers@XCorporation.host.com mailbox, and would like to create a version of this mailbox for ZCo. (e.g. for use by the ZCo. sales force).

To package the XCorporation NewCustomer mailbox into an application, an XCorporation user of project management application 102, such as a system administrator (or other individual with application creation permission) may create an application through an interface. In one example, the administrator may access the interface through project management application 102. A window may presented that may allow the administrator to see the mailboxes that are available for packaging in applications. The administrator may select which mailboxes he or she would like packaged. For example, the administrator may designate for packaging the NewCustomers@XCorporation.host.com mailbox.

In one example a check box may be provided to allow the administrator to designate whether he or she would like to package with the mailbox all rules that are associated with the mailbox. Another check box, may allow the administrator to indicate whether he or she would like to include with the mailbox all custom fields that have been created (e.g. when objects have been created or modified by the rule).

Figure 10A:
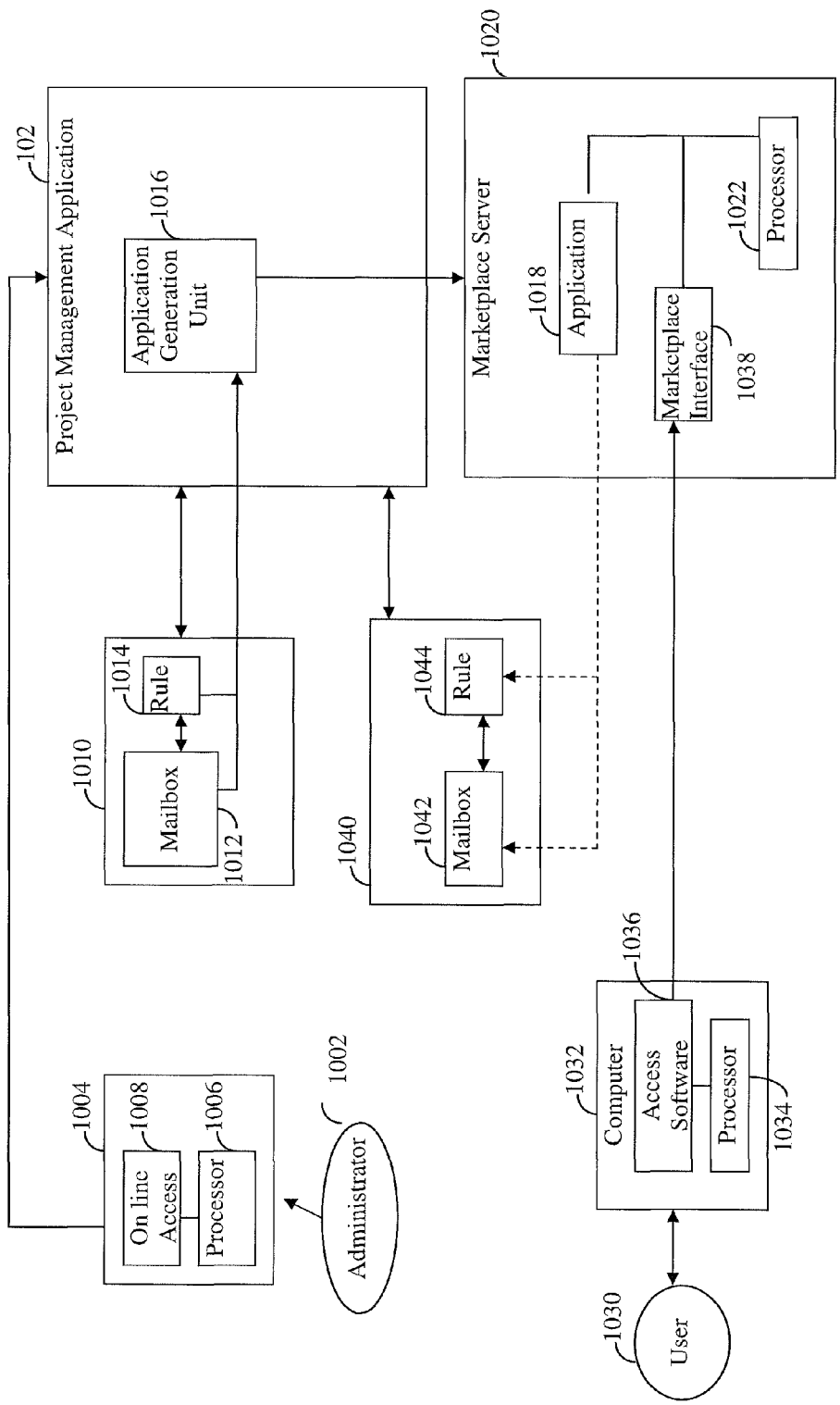
FIG. 10A illustrates system elements for packaging a mailbox, related rules and information into an application, according to an embodiment of the invention.

Reference is now made to FIG. 10A, which illustrates elements for packaging a mailbox and its related rules and information into an application, according to an embodiment of the present invention. In FIG. 10A, administrator 1002, operating computer 1004 may access project management application 102, e.g. via the Internet. Computer 1004 may include processor 1006, which may operate on-line access program 1008 to access project management application 102.

To generate the application, administrator 1002 may access an interface of project management application 102. Administrator 1002 may designate the mailbox(es) to be included in the application and indicate whether the associated rules and other information (such as any custom data fields) are to be included.

For example, administrator 1002 may have permission to access mailboxes of XCorporation in domain 1010. Domain 1010 may contain mailbox 1012 (e.g. the NewCustomers@XCorporation.host.com mailbox) and mailbox 1012 may have associated with it rule 1014 (where rule 1014 may include custom fields). Administrator 1002 may indicate that he or she would like to include mailbox 1012 (and its rule and related custom fields) in an application. The request may trigger execution of application generation unit 1016, which may be included in project management application 102 (and executed by processor 132).

Application generation unit 1016, may obtain a copy of mailbox 1012, a copy of the associated rules 1014 (e.g. any custom fields) and this data may be bundled together to make an application Application 1018 when generated may be stored on a server such as marketplace server 1020 (which includes processor 1022).

User 1030 (who has heard of the NewCustomer@XCorporation.host.com mailbox from administrator 1002) may wish to obtain a copy of application 1018. User 1030 may assess marketplace server 1020 to obtain the copy. User 1030 may access marketplace server 1020 using computer 1032, which may include processor 1034 and marketplace access software 1036 (to enable on-line access to the application market place server 1020 through marketplace interface 1038).

User 1030 may have permission to obtain mailboxes and rules for domain 1040 (a domain of ZCo.). In accessing application marketplace server 1020 through marketplace interface 1038, user 1030 may indicate that he or she would like a copy of application 1018 to be installed for use in domain 1040. For a fee (e.g. with a commission paid to the owner of domain 1010) or for no charge, processor 1022 may transfer a copy of the mailbox and rules of application 1018 onto the storage for domain 1040. Mailbox 1042, when installed, may now be renamed using the downloading organization domain. For example if the downloading organization's domain name is Achme.host.com, then the new mailbox may be called: NewCustomers@Achm.host.com. The rules associated with it 1044 (and any custom fields) may be downloaded and associated with this new mailbox too. The users of domain 1040 may use mailbox 1042, just as the users of domain 1010 use mailbox 1012. Other naming conventions may be used.

Figure 10B:
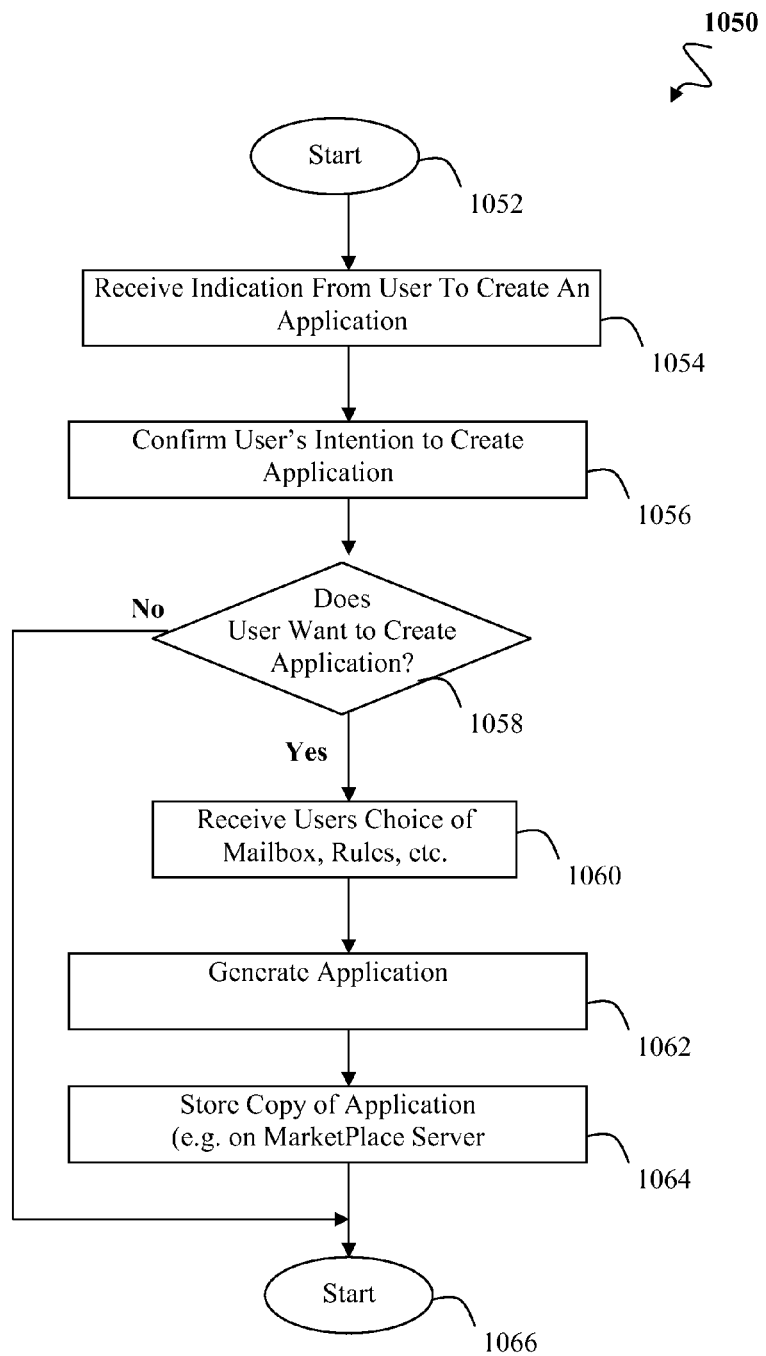
FIG. 10B illustrates a process for generating an application from a mailbox, associated rules and related information, according to an embodiment of the invention.

Reference is now made to FIG. 10B, which illustrates process 1050 for generating an application from a mailbox, associated rules and related information. Processor 132 of server 122, executing application generation unit 1016 for example, may execute process 1050. In operation 1052 the process 1050 begins and in operation 1054 process 1050 may provide a user with an indication to create an application from one or more mailboxes currently existing in a domain. In operation 1056, process 1050 may present a user with an interface to confirm the users intention to create an application and to obtain mailbox information concerning the mailbox, related rules and other information (e.g. custom field information) that may be included in the application.

In operation 1058, input from the user may arrive on his or her choices in creating an application. If in operation 1058, the user chooses to not receive create an application, he or she may cancel the operation, and in such an event of cancellation, process 1050 may terminate at operation 1066. If in operation 1058, the user does not cancel, process 1050 may proceed in operation 1060 to receive the user's choices of the mailboxes, the rules and other information (custom field information) for creating the application.

In operation 1062, process 1050 may generate the application using for example the information on mailboxes, rules and other information. For example, in generating the application, process 1050 may check if the organization's quota for mailboxes will be exceeded as a result of the installation and alert for example an administrative employee. In operation 1064, process 1050 may store a copy of the application in a location that may be accessible to other users, such as a marketplace server. For example in operation 1064, process 1050 may provide an indication of the availability of the new application through an interface and other users may select the new application for downloading or other copying.

Figure 10C:
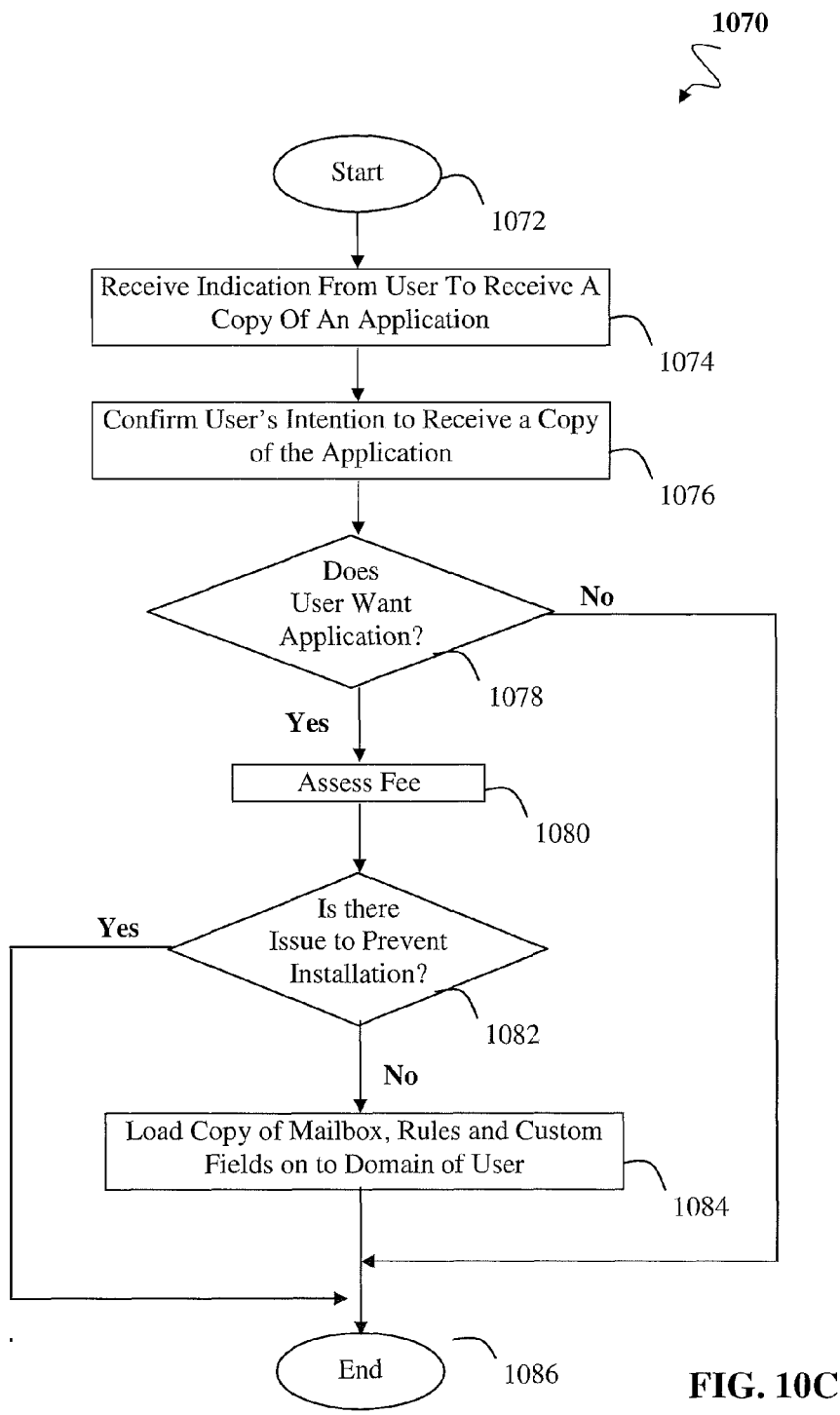
FIG. 10C illustrates a process for downloading and installing an application form a server such as an application marketplace, according to an embodiment of the invention.

Reference is now made to FIG. 10C, which illustrates process 1070 for downloading and installing an application for a server such as an application marketplace. Processor 1022 of marketplace server 1020, for example executing marketplace interface 1038 may perform Process 1070.

In operation 1072 the process may begin and in operation 1074 process 1070 may receive an indication from a user that he or she would like to receive a copy of an application in the market place (such as application 1018, FIG. 10A). In operation 1076, process 1070 may confirm the user's intention to obtain the application, for example, notifying the user that he or she (or his or her organization) may be charged a fee in exchange for receiving a copy of the application.

If in operation 1078, the user indicates that he or she does not wish to accept the application (e.g. for a fee), process 1070 may terminate (e.g. in operation 1086). If the user confirms his or her desire to obtain the application, process 1070 may continue to operation 1080 to assess the user (or his or her organization a fee). Fee charging may in operation 1080 may be accomplished by purchasing the application first through a dedicated PO form (while the project management database stores an applications registry, including billing info, charges, fee, etc). If in operation 1082, there is a payment or other issue to prevent copying and installation of the application (e.g. mailbox is not appropriate for users domain), process 1070 may terminate (e.g. in operation 1086). If in operation 1082 there is no payment or other issue, process 1070 may proceed in operation 1084 to load a copy of the mailbox (and its associated rules (e.g. with custom data fields) on to the server that is running the users domain. The process terminates in operation 1086.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

Different embodiments are disclosed herein. Features of certain embodiments may be combined with features of other embodiments; thus certain embodiments may be combinations of features of multiple embodiments. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for project management database update for a project management application, the method comprising:
   in a system comprising a plurality of mailboxes, each mailbox associated with a plurality of rules, parsing a labelled electronic message received at a mailbox, the mailbox associated with a plurality of rules each rule including a label, to locate for a rule of the plurality of rules the label corresponding to the rule in the body of the received electronic message, the label signaling the location of data in the electronic message, the data corresponding to a rule variable;
   if the label cannot be found, parsing the message according to another rule of the plurality of rules;
   if the label can be found, obtaining the data in the electronic message that corresponds to the rule variable;
   if the data indicates the rule should be executed, executing, according to the rule of the plurality of rules, an action triggered by the obtained data to create or edit a project management object of a project management database of the project management application, wherein the project management application provides the function of task setting, scheduling and resource management for projects undertaken by an organization; and
   if the data does indicate the rule should be executed, parsing the message and obtaining data according to another rule of the plurality of rules.

2. The method of claim 1, wherein the project management object is one of a project, milestone or task object.

3. The method of claim 1, wherein the project management object is an issue object.

4. The method of claim 1, wherein the electronic message comprises an attachment, the method comprising:
   associating the attachment with the project management object in the project management database as a document of the object.

5. The method of claim 1, wherein the electronic message is an e-mail message.

6. The method of claim 5, wherein the e-mail message comprises an e-mail body text, and the e-mail body text is associated with the project management object in the project management database as a note.

7. The method of claim 5, wherein the e-mail message comprises a subject field comprising data and the data of the subject field is stored in the project management database as the title of the project management object.

8. The method of claim 5, wherein the e-mail message comprises a copied to field comprising data and data from the copied to field is stored by the project management database as a resource that is associated with the object.

9. The method of claim 8, wherein the data of the copied to field is an e-mail address, wherein the e-mail address corresponds in the project management database to the name of a person.

10. The method of claim 1, comprising adding a rule, wherein the rule comprises a set of data requirements and a set of actions to trigger in the project management database if the electronic message contains data to satisfy the set of data requirements.

11. The method of claim 1, comprising:
    creating a hierarchy for applying the roles to an electronic message received for the mailbox according to a predetermined order; and
    applying the roles to an electronic message received for the mailbox according to the order of the hierarchy, wherein when the electronic message received satisfies an applied rule according to one or more conditions of the applied rule, no further rules are applied.

12. A system for project management database update for a project management application, the system comprising:
- a memory; and
- a processor to:
  - in a mailbox of a plurality of mailboxes, each mailbox associated with a plurality of rules, each rule including a label, find a label within the body of a labeled electronic message, the label associated with a rule of the plurality of rules, the label signaling the location of data in the electronic message;
  - if the label cannot be found, find a label within the body of the labeled electronic message, the label associated with another rule of the plurality of rules; if the label can be found, identify data within the labelled electronic message for a user-defined variable based on the label;
  - if the data indicates the rule should be executed, trigger execution according to the data for the variable of an action of the rule associated with the mailbox for receipt of the electronic message, wherein the action causes creation or editing of a project management object of the project management database of the project management application, wherein the project management application provides the function of task setting, scheduling and resource management for projects undertaken by an organization; and
  - if the data does indicate the rule should be executed, find a label within the message according to another rule of the plurality of rules.

13. The system of claim 12, wherein the processor is to:
- provide an interface for a user to define a rule to trigger the action within the project management application,
- wherein the rule defines a variable identified by the label and the label defines a parameter of the action.

14. The system of claim 12, wherein the processor is to obtain data from the electronic message to provide to the business rules engine.

15. The system of claim 12, wherein the processor is to create a domain for the mailbox.

16. The system of claim 12, wherein the processor is to:
- receive a request from a user for the mailbox address of a domain;
- generate a vCard file corresponding to the mailbox address;
- attach the vCard file to an e-mail message; and
- send the e-mail message to an e-mail address provided by the user.

17. The system of claim 12, wherein the processor is to:
- create an application file comprising a mailbox and a rule associated with the mailbox from a first domain;
- store the file at a marketplace server location;
- provide an interface for downloading a copy of the application file from the server to a second domain;
- receive a copy of the application file to be download at the second domain; and
- install the mailbox and the associated rule on the second domain.

18. A non-transitory computer readable medium having stored thereon instructions which when executed by a processor cause the processor to perform the method of:
- in a system comprising a plurality of mailboxes, each mailbox associated with a plurality of rules, parsing a labelled electronic message received at a mailbox, the mailbox associated with a plurality of rules each rule including a label, to locate for a rule of the plurality of rules the label corresponding to the rule in the body of the received electronic message, the label signaling the location of data in the electronic message, the data corresponding to a rule variable;
- if the label cannot be found, parsing the message according to another rule of the plurality of rules; if the label can be found, obtaining the data in the electronic message that corresponds to the rule variable;
- if the data indicates the rule should be executed, executing, according to the rule of the plurality of rules, an action triggered by the obtained data to create or edit a project management object of a project management database of the project management application, wherein the project management application provides the function of task setting, scheduling and resource management for projects undertaken by an organization; and
- if the data does indicate the rule should be executed, parsing the message and obtaining data according to another rule of the plurality of rules.

\* \* \* \* \*